(12) United States Patent
Zink et al.

(10) Patent No.: US 9,294,808 B2
(45) Date of Patent: Mar. 22, 2016

(54) TRANSMISSION CONCEPT FOR AN ACCESS UNIT STREAM

(75) Inventors: Alexander Zink, Stegaurach (DE); Christian Kellermann, Nuremberg (DE); Hussain Mohammed, Bonn (DE); Nikolaus Faerber, Erlangen (DE); Herbert Thoma, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 881 days.

(21) Appl. No.: 13/410,836

(22) Filed: Mar. 2, 2012

(65) Prior Publication Data

US 2012/0278498 A1 Nov. 1, 2012

(51) Int. Cl.
| | |
|---|---|
| G06F 15/16 | (2006.01) |
| H04N 21/435 | (2011.01) |
| H04N 21/235 | (2011.01) |
| H04N 21/2383 | (2011.01) |
| H04N 21/845 | (2011.01) |
| H04N 19/66 | (2014.01) |
| H04N 19/67 | (2014.01) |

(52) U.S. Cl.
CPC ............ *H04N 21/435* (2013.01); *H04N 19/66* (2014.11); *H04N 19/67* (2014.11); *H04N 21/235* (2013.01); *H04N 21/2383* (2013.01); *H04N 21/8455* (2013.01); *H04N 21/8456* (2013.01)

(58) Field of Classification Search
CPC .................................................. G06F 12/0246
USPC .......... 709/229, 230, 231, 232; 711/102, 103, 711/105
See application file for complete search history.

(56) References Cited

U.S. PATENT DOCUMENTS

| | | | | |
|---|---|---|---|---|
| 5,481,543 | A | * | 1/1996 | Veltman ............... H04N 5/9206 348/423.1 |
| 6,606,660 | B1 | | 8/2003 | Bowman-Amuah et al. |
| 6,961,326 | B1 | | 11/2005 | Chang et al. |
| 7,400,642 | B2 | | 7/2008 | Koo et al. |
| 2004/0083417 | A1 | * | 4/2004 | Lane ................... H03M 13/356 714/758 |

FOREIGN PATENT DOCUMENTS

| | | |
|---|---|---|
| JP | H09-186667 | 7/1997 |
| JP | 2006-505193 | 2/2006 |
| RU | 2204215 C2 | 5/2003 |
| RU | 2333603 C2 | 9/2008 |

OTHER PUBLICATIONS

"Key Frame Extraction from MPEP Video Stream"—Liu et al, Qingdao Univ. of Science, Dec. 2009 http://academypublisher.com/proc/iscsct09/papers/iscsct09p7.pdf.*

(Continued)

*Primary Examiner* — Randy Scott
(74) *Attorney, Agent, or Firm* — Michael A. Glenn; Perkins Coie LLP

(57) ABSTRACT

A transmission signal having a sequence of logical frames embed therein, is constructed such that each logical frame has a useful data section, wherein consecutive access units of an access unit stream are consecutively inserted into the useful data section of the sequence of logical frames, wherein each logical frame into which a begin of an access unit falls, has an access unit table having, per begin of the access units falling into the respective logical frame, a pointer pointing thereto.

50 Claims, 19 Drawing Sheets

(56) References Cited

OTHER PUBLICATIONS

Digital Radio Mondiale (DRM); Distribution and Communications Protocol (DCP) European B roadcasting U nion U nion E uropéenne de R adio-Télévision EP UÜER; ETSI TS 102 821; ETSI Standards, LIS, Sophia Antipolis Cedex, France, vol. BC, No. V1.2.1, Oct. 1, 2005, XP014032378, ISSN: 0000-0001, the whole document.

ISO/IEC: ISO/IEC 13818-1. Information Technology—Generic Coding of Moving Pictures and Associated Audio Information: Systems. // Technologies De L'Information—Codage Générique des Images Animées et du son Associeé: Systémes—Recommendation ITU-T H. 222.0 (2000E); International Standard ISO/IEC; vol. 13818-1, Dec. 1, 2000; pp. I-XVII, 1, XP002601409, pp. 13, 19, 43; figures 2-2, 2-24.

Okubo, Sakae et al., "Revised Third Edition of H.64/AVC Textbook", pp. 99-107 and 214-230 (no translation available).

\* cited by examiner

US 9,294,808 B2

TRANSMISSION CONCEPT FOR AN ACCESS UNIT STREAM

CROSS-REFERENCE TO RELATED APPLICATIONS

This application is a continuation of copending International Application No. PCT/EP2010/063050, filed Sep. 6, 2010, which is incorporated herein by reference in its entirety, and additionally claims priority from U.S. Application No. U.S. 61/240,833, filed Sep. 9, 2009 which is also incorporated herein by reference in its entirety.

BACKGROUND OF THE INVENTION

The present invention relates to transmission of,—or preparation, for transmission, of—an access unit stream such as a stream of media, such as video, audio, text or other data, access units. In some embodiments, the transmission involves the transmission of video access units via an audio broadcast signal, such as DRM.

There are many transmission capabilities especially dedicated for the transmission of specific kinds of data such as video and audio data, respectively. For example, DVB-T has been designed to broadcast video data. DRM, in turn, was designed to reach, via audio content, audiences scattered over a wide geographical area in order to keep citizens living abroad informed and up-to-date about what is going on in the home country, for example. Whatever transmission capability is considered, the design parameters of these transmission capabilities, such as maximum bandwidth for the useful data, the number of channels or programs being supported and the performance in terms of adjusting the bandwidth distribution among the supported channels or programs, is configured to fit to the demands posed by the specific form of data for which the respective transmission capability has been designed. For example, audio content needs less bandwidth than video content. Moreover, the error tolerances are different. Some of the transmission capabilities are dedicated for being transmitted via physical layers which, per se, have a limited bandwidth capability. DRM, for example, was originally designed to be transmitted in the bands allowing larger broadcast distances with, however, accepting limited bandwidth capabilities resulting therefrom.

Based on the transmission capabilities being available so far, there is a need for a transmission concept or for a transmission preparation concept which enables the transmission of an access unit stream via some existing transmission capability which has, for example, not been designed to transmit such access unit stream in terms of bandwidth, for example. Consider, for example, attempting to provide a video transmission service within a transmission capability such as within the DRM structure. DRM transmits the useful data at relatively low bandwidth when considering video content needs and using bursts at a considerable burst pitch. In such a situation, a considerable time delay would result when switching from one program to the just-mentioned video content, during which, at the decoding side, the decoder would not even have the capability to synchronize into the video content.

SUMMARY

According to an embodiment, an apparatus for preparing an access unit stream of consecutive access units, representing media content, for a transmission via a transmission signal, may be configured to generate a sequence of logical frames from the access unit stream by consecutively inserting the consecutive access units into a useful data section of the logical frames of the sequence of logical frames, wherein the logical frames comprise logical frames into which no begin of an access unit falls, a begin of one access unit falls, and a begin of two access units falls, respectively; and providing each logical frame into which a begin of an access unit falls, with an access unit table comprising, per begin of the access units falling into the respective logical frame, a pointer pointing thereto.

According to another embodiment, a transmission chain may have an apparatus for preparing an access unit stream of consecutive access units, representing media content, for a transmission via a transmission signal, wherein the apparatus may be configured to generate a sequence of logical frames from the access unit stream by consecutively inserting the consecutive access units into a useful data section of the logical frames of the sequence of logical frames, wherein the logical frames comprise logical frames into which no begin of an access unit falls, a begin of one access unit falls, and a begin of two access units falls, respectively; and providing each logical frame into which a begin of an access unit falls, with an access unit table comprising, per begin of the access units falling into the respective logical frame, a pointer pointing thereto, wherein the apparatus is configured to provide each logical frame with a logical frame header indicating the absence of an access unit table in the respective logical frame for logical frames into which no begin of any of the consecutive access unit falls, and the length of the access unit table of the respective logical frame for logical frames into which the begin of at least one of the consecutive access units falls, wherein the apparatus is configured to provide each access unit table with an access unit table entry per access unit the begin of which falls into the respective logical frame, and the logical frame header indicating the length of the access unit table of the respective logical frame in units of the number of access unit table entries within the access unit table of the respective logical frames, with beginnings of the access unit table entries being spaced apart from the leading or rear end of the logical frame in units of a constant length, each access unit table entry comprising a pointer pointing to a respective one of the begin of the access units, falling into respective logical frame, with each access unit table being provided with additional redundancy data allowing for an access unit table entry individual data corruption detection and/or correction, wherein the apparatus is configured to perform the continuous insertion of the consecutive access units into the useful data section of the logical frames using a useful data insertion direction, and to arrange the access unit table and the logical frame header within the logical frames into which a begin of an access unit falls, so that the useful data section occupies a connected portion of the respective logical frame comprising one constantly positioned border and a varying positioned border offset from the constantly positioned border depending on the length of the access unit table, wherein the apparatus is configured to generate the sequence of logical frames such that the access unit table and logical frame header border, or are constantly offset from, opposite ones of the leading and rear ends of the logical frames, and a transmission stage for transmitting the transmission signal.

According to another embodiment, an apparatus for recovering an access unit stream of consecutive access units, representing media content, from a sequence of logical frames of a transmission signal, each logical frame comprising a useful data section, wherein the consecutive access units are consecutively inserted into the useful data section of the sequence of logical frames, wherein the logical frames comprise logical frames into which no begin of an access unit falls, a begin of one access unit falls, and a begin of two access units falls, respectively, may be configured to, for a predetermined logical frame, into which a begin of an access unit falls, extract an access unit table from the predetermined logical frame comprising, per begin of the access units falling into the predetermined logical frame, a pointer pointing to a respective begin position within the predetermined logical frame, and locate, and commence extraction of, the respective access unit the begin of which falls into the predetermined logical frame, by use of the respective pointer, the apparatus also being configured to consecutively extract the consecutive access units of the access unit stream from the useful data section of the logical frames of the sequence of logical frames.

According to another embodiment, a method for preparing an access unit stream of consecutive access units, representing media content, for a transmission via a transmission signal, may have the steps of generating a sequence of logical frames from the access unit stream by consecutively inserting the consecutive access units into a useful data section of the logical frames of the sequence of logical frames, wherein the logical frames comprise logical frames into which no begin of an access unit falls, a begin of one access unit falls, and a begin of two access units falls, respectively; and providing each logical frame into which a begin of an access unit falls, with an access unit table comprising, per begin of the access units falling into the respective logical frame, a pointer pointing thereto.

According to another embodiment, a method for recovering an access unit stream of consecutive access units, representing media content, from a sequence of logical frames of a transmission signal, each logical frame comprising a useful data section, wherein the consecutive access units are consecutively inserted into the useful data section of the sequence of logical frames, wherein the logical frames comprise logical frames into which no begin of an access unit falls, a begin of one access unit falls, and a begin of two access units falls, respectively, the method comprising, for a predetermined logical frame, into which a begin of an access unit falls, extracting an access unit table from the predetermined logical frame comprising, per begin of the access units falling into the predetermined logical frame, a pointer pointing to a respective begin position within the predetermined logical frame, and locating, and commencing extraction of, the respective access unit the begin of which falls into the predetermined logical frame, by use of the respective pointer, may also have the steps of consecutively extracting the consecutive access units of the access unit stream from the useful data section of the logical frames of the sequence of logical frames.

According to another embodiment, a transmission signal may have a sequence of logical frames embedded therein, each logical frame comprising a useful data section, wherein consecutive access units of an access unit stream are consecutively inserted into the useful data section of the sequence of logical frames, wherein the logical frames comprise logical frames into which no begin of an access unit falls, a begin of one access unit falls, and a begin of two access units falls, respectively, wherein each logical frame into which a begin of an access unit falls, comprises an access unit table comprising, per begin of the access units falling into the respective logical frame, a pointer pointing thereto.

According to another embodiment, a computer program may have a program code for performing, when running on a computer, a method for recovering an access unit stream of consecutive access units, representing media content, from a sequence of logical frames of a transmission signal, each logical frame comprising a useful data section, wherein the consecutive access units are consecutively inserted into the useful data section of the sequence of logical frames, wherein the logical frames comprise logical frames into which no begin of an access unit falls, a begin of one access unit falls, and a begin of two access units falls, respectively, the method comprising, for a predetermined logical frame, into which a begin of an access unit falls, extracting an access unit table from the predetermined logical frame comprising, per begin of the access units falling into the predetermined logical frame, a pointer pointing to a respective begin position within the predetermined logical frame, and locating, and commencing extraction of, the respective access unit the begin of which falls into the predetermined logical frame, by use of the respective pointer, the method also comprising consecutively extracting the consecutive access units of the access unit stream from the useful data section of the logical frames of the sequence of logical frames.

According to another embodiment, a computer program may have a program code for performing, when running on a computer, a method for preparing an access unit stream of consecutive access units, representing media content, for a transmission via a transmission signal, the method comprising generating a sequence of logical frames from the access unit stream by consecutively inserting the consecutive access units into a useful data section of the logical frames of the sequence of logical frames, wherein the logical frames comprise logical frames into which no begin of an access unit falls, a begin of one access unit falls, and a begin of two access units falls, respectively; and providing each logical frame into which a begin of an access unit falls, with an access unit table comprising, per begin of the access units falling into the respective logical frame, a pointer pointing thereto.

The present invention provides for an apparatus for preparing an access unit stream of consecutive access units, representing media content, for a transmission via a transmission signal, the apparatus configured to generate a sequence of logical frames from the access unit stream by consecutively inserting the consecutive access units into a useful data section of the logical frames of the sequence of logical frames, and providing each logical frame into which a begin of an access unit falls, with an access unit table comprising, per begin of the access units falling into the respective logical frame, a pointer pointing thereto.

As each logical frames into which a begin of an access unit falls, is provided with an access unit table comprising, per begin of the access units falling into the respective logical frame, a pointer pointing thereto, a decoder receiving the transmission signal and the sequence of logical frames, respectively, is able to locate and access the access units in the logical frames as soon as possible by using the pointers.

Accordingly, in accordance with an embodiment of the present invention, an apparatus for recovering an access unit stream of consecutive access units, representing media content, from a sequence of logical frames of a transmission signal, with each logical frame comprising a useful data section, is provided. The consecutive access units are consecutively inserted into the useful data section of the sequence of logical frames and the recovering apparatus is configured to, for a predetermined logical frame into which a begin of an access unit falls, extract an access unit table from the predetermined logical frame comprising, per being of the access units falling into the predetermined logical frame, a pointer pointing to a respective begin position within the predetermined logical frame, and locate, and commence extraction of, the respective access unit the begin of which falls into the predetermined logical frame, by use of the respective pointer, the apparatus also being configured to consecutively extract the consecutive access units of the access unit stream from the useful data section of the logical frames of the sequence of logical frames.

Advantageous implementations are the subject of the enclosed dependent claims.

BRIEF DESCRIPTION OF THE DRAWINGS

In particular, embodiments of the present application are described below with respect to the figures, among which.

DETAILED DESCRIPTION OF THE INVENTION

Figure 1:
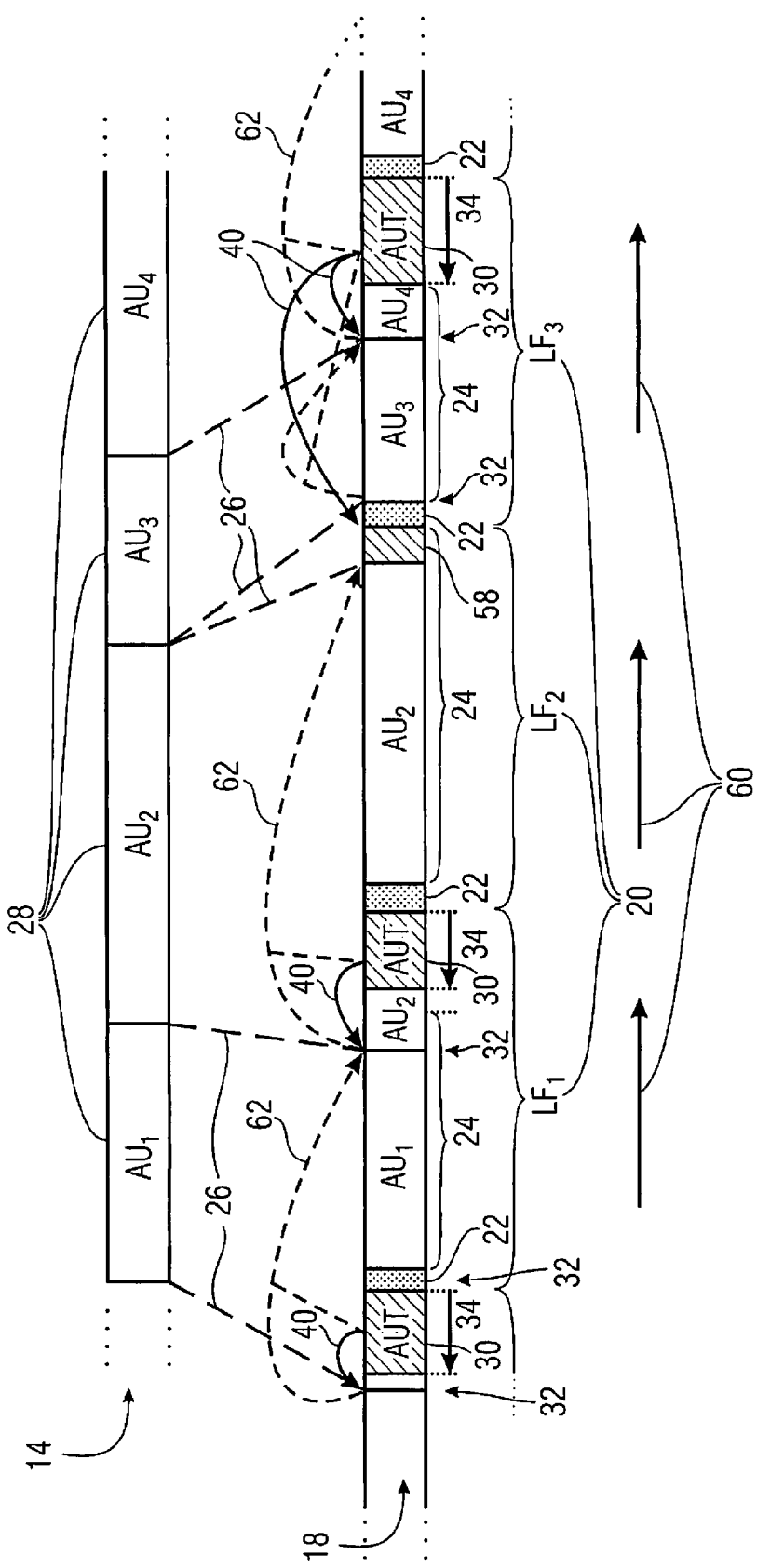
FIG. 1 shows a schematic diagram illustrating the consecutive insertion of an access unit stream into a sequence of logical frames and the structure of the logical frames in accordance with an embodiment of the present invention.
Figure 2:
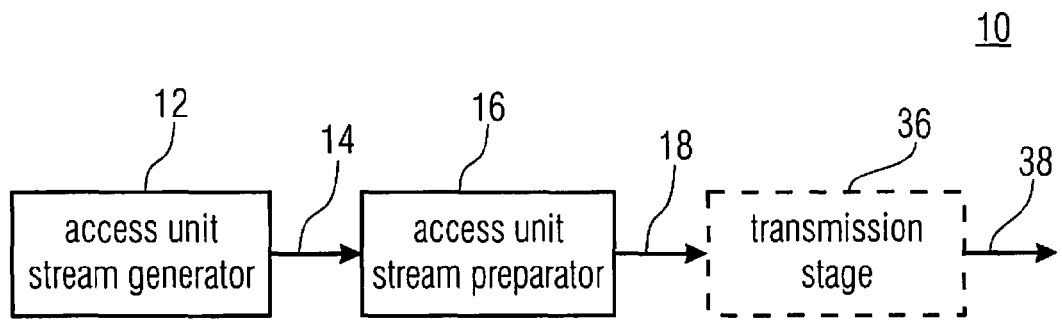
FIG. 2 shows a block diagram of a transmission chain in accordance with an embodiment.

Firstly, with respect to FIGS. 1 and 2, an embodiment for the preparation of an access unit stream of consecutive access units, representing media content, for a transmission via a transmission signal, is described. FIG. 2 shows a transmitter or transmission chain 10 comprising an access unit stream generator 12 configured to generate an access unit stream 14 of consecutive access units, the access unit stream 14 representing media content, such as video content or video and audio content or video content along with time-aligned textual or data content such as news or the like.

The access unit stream generator 12 may comprise a video encoder, an audio encoder and/or a text content generator or the like, or may even accept AUs from some external source(s). Accordingly, the access unit stream 14 may in fact be composed of one or more separate substreams of access units with the access units of the different substreams being arranged within the access unit stream 14 in an interleaved form so that access units of the individual substreams pertaining the same presentation time, are grouped together to be as close as possible or, in other words, immediately—or within some predetermined maximum time limit—follow each other in the access unit stream 14.

Further, transmission chain 10 of FIG. 2 comprises an access unit stream preparator 16 configured to prepare the access unit stream 14 of consecutive access units for a transmission via a transmission signal. To this end, access unit stream preparator 16 is configured to generate a sequence 18 of logical frames from the access unit stream 14 by consecutively inserting the consecutive access units into a useful data section of the logical frames of the sequence of logical frames and providing each logical frame into which a begin of an access unit falls, with an access unit table comprising, per begin of the access units falling into the respective logical frame, a pointer pointing thereto. FIG. 1, for example, shows an exemplary portion of an access unit stream 14 including, exemplary, four access units $AU_1$ to $AU_4$ and the corresponding portion of the sequence 18 of logical frames encompassing, exemplary, logical frames $LF_1$, $LF_2$ and $LF_3$. As shown in FIG. 1, the access unit stream preparator 16 may be configured such that each logical frame 20 comprises a logical frame header 22 and a useful data section 24. As will be described in more detail below, the logical frames 20 need not to be of constant length although the logical frames $LF_1$ to $LF_3$ depicted in FIG. 1 are thus illustrated.

Dotted lines 26 in FIG. 1 illustrate the consecutive insertion of the access units 28 into the useful data section 24 of the sequence 18 of logical frames 20. As is visible from FIG. 1, the access unit stream preparator 16 may be configured to provide merely those logical frames 20 with an access unit table 30 into which a begin 32 of any of the access units 28 actually falls. Among the logical frames $LF_1$ to $LF_3$, the logical frames 20 are such logical frames $LF_1$ and $LF_3$ whereas logical frame $LF_2$ does not comprise a begin of an access unit 24 and, accordingly, no access unit table.

Further, as shown in FIG. 1, the access unit stream preparator 16 may additionally be configured such that the optional logical frame headers 22 are registered with their leading end at the leading end of the respective logical frame to which the logical frame header 22 belongs. As illustrated in FIG. 1, the logical frame headers 22 may be of constant size, i.e., the size may be equal to each other among the logical frames 20. As far as the access unit table 30 is concerned, however, the access unit stream preparator 16 may be configured to register the access unit tables 30 with their rear end to the rear end of the respective logical frame to which the respective access unit table 30 belongs, as illustrated in FIG. 1, or, alternatively, to the leading end of the respective logical frame to which the respective access unit table 30 belongs (i.e. forward or reverse insertion). The access unit tables 30 may have a varying size or length 34 depending on the number of access units 20 the begin 32 of which falls into the respective logical frame 20. Comparing logical frames $LF_1$ and $LF_3$, for example, two access units $AU_3$ and $AU_4$ have their respective begin 32 arranged within the useful data section 24 of logical frame $LF_3$, whereas merely one access unit, namely access unit $AU_2$ has its begin 32 arranged within the useful data section of logical frame $LF_1$ so that the access unit table 34 of logical frame $LF_1$ has a length 34 smaller than the length 34 of the access unit table 30 of logical frame $LF_3$.

In case the access unit stream preparator 16 is configured to arrange the logical frame header 22 and the access unit table 30 at different ones of the leading end and rear ends of the logical frames 20 as just-described, the useful data section 24 is arranged between the logical frame header 22 and the access unit table 30 for logical frames 20 into which a begin 32 of an access unit 28 falls, and the logical frame header 22 and the opposite end of the respective logical frame for logical frames into which no begin 32 of an access unit 28 falls.

The transmission chain 10 of FIG. 2 further, optionally, comprises a transmission stage 36 for transmitting a transmission signal 38 including, or having embedded therein, the sequence 18 of logical frames 20. For example, transmission stage 36 may broadcast the transmission signal 38. The transmission stage 36 may represent a transport layer which, in accordance with the OSI model, is beneath the transport layer which access unit stream preparator 16 belongs to. For example, the sequence of logical fames may be embedded in a MSC steam which, in turn, is transmitted by transmission stage 36 in form of a sequence of transmission frames, the latter one of which are transmitted via respective modulation symbols. Transmission stage 36 may, for example, transmit the transmission signal 38 in bursts and, for example, by way of an OFDM signal or the like. The size of the logical frames 20 may be constant over time or may be variable, in which case the size of the respective logical frames 20 may be indicated within a side information channel of the transmission signal 38. Further, the side information channel of the transmission signal 38 may comprise information such as data times indicating to the receiver when the next burst including the next logical frame occurs within the transmission signal 38 so as to enable effective power savings at the receiver side, and/or indications as to where the start and end of the logical frames is positioned within the transmission signal 38.

Thus, in operation, access unit stream generator 12 generates the access units 28, and the access unit stream preparator 16 consecutively inserts the consecutive access unit 28 into the useful data section 24 of the logical frames 20 with providing each logical frame 20 into which the begin 32 of an access unit 28 falls, with an access unit table 30. Each access unit table 30 comprises, per begin 32 of the access units 28 falling into the respective logical frame 20, a pointer 40 pointing to the respective begin 32. Due to the existence of pointers 40, a receiver receiving the logical frames 20 within transmission signal 38 is immediately able to locate and access the first access unit as soon as the decoder receives the first logical frame in time, into which a begin 32 of the access units 28 falls. To this end, the receiver may use the above-mentioned additional indications in, for example, the side information channel of transmission signal in order to know in advance about the start and end positions of the logical frames 20, or the borders of the logical frames may be determined implicitly by the overall structure of the transmission signal. Thus, even when the bandwidth used by the transmission stage 36 is small, the decoder delay in synchronizing onto the access unit stream conveyed via transmission signal 38 is not additionally increased by additional synchronization needs which would otherwise be needed for the decoder in order to locate the access units.

Figure 3:
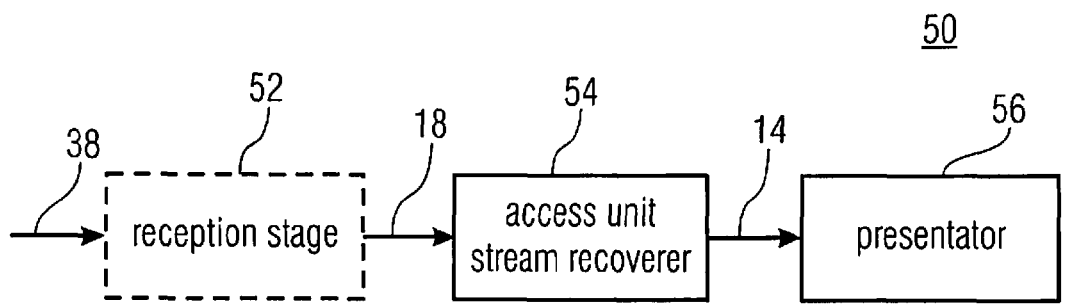
FIG. 3 shows a block diagram of a reception chain in accordance with an embodiment.

FIG. 3 shows a reception chain or receiver 50 suitable for receiving the transmission signal 38 comprising the sequence 18 of logical frames 20 or having the latter embedded therein, respectively. Reception chain 50 comprises, optionally, a reception stage 52 as a counterpart to the transmission stage 36. In other words, reception stage 52 may belong to the same transport layer transmission stage 36 belongs to. Reception stage 52 may comprise an antenna, amplifiers, a demodulator, a forward error corrector such as including, for example, a turbo decoder, and/or a de-interleaver as well as some management unit for locating the logical frames within the transmission signal 38 based, for example, on side information transmitted within transmission signal 38 at a certain channel or the like, as already outlined above.

Reception stage 52 forwards the sequence 18 of logical frames 20 to access unit stream recoverer 54 also comprised by decoder 50. The access unit stream recoverer 54 is configured to recover the access unit stream 14 of consecutive access units 28 from the sequence 18 of logical frames 20. In particular, recoverer 54 may be configured to extract from a predetermined logical frame 20 such as the first one received via transmission signal 38, which has a begin 32 of an access unit 28 arranged therein, the access unit table 30 and locate, and commence extraction of, the respective access unit 28 the begin 32 of which falls into the respective logical frame 20, by use of the respective pointer 40 comprised by the extracted access unit table 30. Beside this, recoverer 54 is configured to consecutively extract the consecutive access units 28 of the access unit stream 14 from the useful data section 24 of the logical frames 20 of the sequence 18 of logical frames 20 received from reception stage 52. Further, decoder 50 may comprise a presentator 56 in order to decode and/or present the media content conveyed via the sequence 14 of access units 28 as recovered by recoverer 54 from the logical frames 20. Presentator 56 may, for example, comprise a video decoder, an audio decoder and/or a text or data handler. Further, presentator 56 may comprise a video display and/or a loudspeaker.

Specific details which have been described above with respect to FIGS. 1 to 3, are advantageous, but optional. In the following, advantages of specific details and alternatives are described. For example, as described above, access unit stream preparator 16 may be configured to generate the sequence 18 of logical frames 20 such that the access unit table 30 borders the rear end of the respective logical frame 20. In this regard, it is noted that the rear end of a logical frame 20 is understood to be the end of the logical frame 20 arriving later in time within transmission signal 38 at decoder 50 with the time direction in FIG. 1 pointing to the right hand side, for example. However, alternatively, the access unit table 30 could border the leading end of the respective logical frame 20. Even alternatively, the access unit table 30 may have a predetermined constant offset from the rear or leading end of the respective logical frame 20. In all these cases, recoverer 54 is able to locate the access unit table 30 of the predetermined logical frame 20 the access unit table 30 of which is to be evaluated, at, or at the predetermined constant offset from, the rear or leading end of the respective logical frame 20.

Further, as has also been described above, access unit stream preparator 16 may be configured to generate the sequence 18 of logical frames 20 such that the pointers 40 point to the begin 32 of the access units 28 falling into the respective logical frame 20 from a registration point positioned with respect to the rear or leading end of the respective logical frame 20 in a manner constant among the logical frames 20 into which a begin 32 of an access unit 28 falls. In the specific embodiments described below, for example, the pointers 40 are indicated in the respective access unit tables 30 in units of bytes or bits or some other unit length, measured from the leading end of the respective logical frame on. However, alternatively, other points within the logical frames than the leading end thereof may serve as the just-mentioned registration point from which pointers 40 point to the beginnings 32 of the access units 28. Accordingly, recoverer 54 may be configured to, in locating a respective access units the begin 32 of which falls into a currently inspected logical frame 20, use the respective pointer 40 as a displacement from the registration point.

Further, although not explicitly stated with respect to FIG. 1, FIG. 1 illustrates a case according to which access unit stream preparator 16 is configured to seamlessly insert the consecutive access units 28 into the useful data section 24 of the logical frames 20, at least, as far as possible. The gap 58 between access unit $AU_2$ and $AU_3$ in FIG. 1, for example, is merely the result of the access unit tables 30 of the embodiment of FIG. 1 having a length 34 which increases with increasing number of beginnings 32 falling into the respective logical frame so that, consequently, the useful data section decreases per additional begin 32 occurring. However, beside such gaps 58 the access unit 28 of FIG. 1 have been seamlessly inserted into the useful data section 24 of the logical frames 20.

Alternatively, however, the access unit 28 may be inserted into the useful data section 24 of the logical frames 20 with don't care padding data arranged there between. For example, depending on the application, the access units 28 may have been generated by access unit stream generator 12 regardless of a certain bit rate by which same have to be conveyed via transmission signal 38, and in order to exactly obey such transmission rate, such padding data may be introduced between certain ones of the access units 28. Thus, the padding data may be integrated within the sequence of logical frames by way of accordingly setting the below-introduced optional length indication and the pointers 40 at the transmission side. Alternatively, however, a unused or specific "stream-ID" indicated, for example, within the AU table for a respective AU may indicate that this AU merely contains "padding data", i.e. is a "padding AU", in which case the resulting AU stream, in turn, would maintain the above-outlined properties of a seamlessly inserted AU stream with, however, enabling padding at the transmission side. At the receiving side, these padding AU would by skipped or neglected, and merely the other AUs would be further processed.

The access unit stream recoverer 54 may, accordingly, seamlessly or merely consecutively extract the consecutive access units 28 from the useful data sections 24 of the logical frames 20. In order to extract the consecutive access units 28, access units stream recoverer 54 may locate the beginnings 32 of following access units 28 either by use of the aforementioned pointers 40 or, alternatively, by detecting the end of a respective access unit 28 by parsing the access units, with this end concurrently representing the beginning 32 of the next access unit 28, except for the presence of a gap-like situation 58 in FIG. 1 which is, however, forecastable by access unit stream recoverer 54.

Further, the access unit stream preparator 16 may be configured to indicate within the logical frame headers 22 the absence of an access unit table 30 in the respective logical frame 20 for the logical frames 20 into which no begin 32 of any of the consecutive access unit 28 falls, and the length 34 of the access unit table 30 of the respective logical frame for logical frames 20 into which the begin 32 of at least one of the consecutive access units 28 falls. By this measure, the access unit stream recoverer 54 is able to extract from the logical frame header 22 of each logical frame 20 an information indicating the absence of or the length of an access unit table 30 within the respective logical frame 20, and to locate an extension of the useful data section 24 of the respective logical frame 20 depending thereupon. In particular, the access unit stream recoverer 54 is able to locate the extension of the useful data section 24 even in case the respective access unit table 30 of the current logical frame is corrupted due to data corruption, and thus, the access unit stream recoverer 54 would be able to correctly continue with extracting an access unit 28 extending over the border between this access unit table 30 and the useful data section 24 to the useful data section 24 of the next logical frame 20, even across the logical frame border therebetween.

Similarly, the access unit stream preparator 16 could be configured such that each logical frame header 22 borders, or has a predetermined constant offset from, the rear or leading end of the respective logical frame 20. In the embodiment of FIG. 1, all logical frame headers 22 border the leading end of the respective logical frame 20. Accordingly, the access unit stream recoverer 54 may be configured to locate, in each logical frame, the logical frame header 22 at, or at a predetermined constant offset from, the leading or rear end of the respective logical frame 20, i.e., irrespective of data corruption within the remaining part of the logical frames 20, such as certain portions of the useful data section 24.

In case of FIG. 1, for example, the access unit stream preparator 16 was configured to perform the continuous insertion of the consecutive access units 28 into the useful data section 24 of the logical frames 20 using a useful data insertion direction 60 and to arrange the access unit table 30 within the logical frames 20 into which a begin 32 of an access unit 28 falls, so as to occupy a connected portion of the respective logical frame 20 having a constantly positioned end pointing into the useful data insertion direction 60, i.e., a constantly positioned rear end, and a varying end pointing contrary to the useful data insertion direction 60, i.e. a varying positioned leading end, which is offset from the constantly positioned end by the length 34 of the access unit table 30. In other words, the indication of the length 34 in the logical frame headers 22 may measure the length or size of the access unit tables 30 measured from the constantly positioned end of the access unit tables 31, namely the rear end thereof. Accordingly, the access unit stream recoverer 54 may be configured to perform the consecutive extraction of the consecutive access unit 28 from the logical frames 20 using a useful data extraction direction equal to the useful data insertion direction within the logical frames 20, and to locate the varying positioned end of the access unit table 30 by applying the length 34 of the access unit table 30 in a counter direction contrary to the useful data extraction direction 60 from a constantly positioned end thereof.

It may be advantageous if the access unit stream preparator 16 is configured to generate the sequence of logical frames 20 such that the access unit tables 30 and logical frame headers 22 border, or are constantly offset from, opposite ones of the leading and rear ends of the logical frames 20 and if, accordingly, the access unit stream recoverer 54 is configured to locate the access unit table 30 and logical frame header 22 of the respective logical frames 20 at, or at a constant offset to, different ones of the leading and rear ends of the respective logical frames 20 as it is the case in FIG. 1. This is particularly true, if the logical frame headers 22 are of varying length, with the length depending on the content of the LF header itself. In this case, the access unit stream recoverer 54 may locate the access unit table 30 and the logical frame header 22 irrespective of data corruption within the useful data section 24 of the respective logical frame, and may locate the access unit table 30 irrespective of data corruption of the logical frame header 22 and vice versa.

To be even more precise, the access unit stream preparator 16 may be configured to generate the sequence 18 of logical frames 20 such that the access unit table 30 and logical frame header 22 border opposite ones of the leading and rear ends of the logical frames 20 so that the useful data section 24 is a connected portion extending, for logical frames 20 into which a begin 32 of an access unit 28 falls, between the access unit table 30 and the logical frame header 22, respectively, and for other logical frames 20 between the logical frame header 22 and the opposite one of the leading and rear ends of the logical frames 20.

As already illustrated in FIG. 1, the access unit stream preparator 16 may be configured to provide in each logical frame 20 into which a begin 32 of an access unit 28 falls, which extends beyond a rear end of the respective logical frame 20 into a subsequent logical frame 20, such as access unit $AU_2$ in FIG. 1, the access unit table 30 with a length indication indicating a length 62 of the respective access unit 28, i.e. an indication enabling to determine the end of the respective logical frame 20 when combined with the pointer 40 pointing to the begin thereof. In FIG. 1, the access unit stream preparator 16 is exemplary configured to accompany each pointer 40 with such a length indication 62 of the access unit 28 the begin 32 of which is pointed to by pointer 40. In case of access units 28 the rear end of which (in parsing direction) is not determinable by parsing the access units 28 or prevented from being detected due to local data errors, the access unit stream recoverer 54 may use the indication of the length 62 in order to separate between access unit content and padding data within the useful data sections 24. However, if the end of the access units 28 is detectable by access unit stream recoverer 54 by parsing the access units, such as by detecting a respective end-of-access-unit-flag in the access unit 28 itself, access unit stream recoverer 54 may detect the end of the respective access unit 28 even in case the length indication 62 in the respective access unit table 30 has been corrupted. In any case, it is advantageous that the access unit stream recoverer 54 may extract such a length indication 62 from the access unit tables 30 in order to obtain the length 62 of access units 28 the begin of which falls into a respective logical frame 20 with extending beyond a rear end of the respective logical frame 20 into a subsequent logical frame even when, for example, the access unit table of the following logical frame is lost or corrupted. In case of a seamless insertion of the access units 28 into the logical frame portions 24, recoverer 54 may even use the length indication of length 62 of such an access unit 28 extending over consecutive logical frames 20 in order to locate the beginning 32 of a subsequent access unit. For example, recoverer 54 may use length 62 of access unit $AU_1$ to detect the beginning 32 of access unit $AU_2$ in case, for example, access unit 30 of logical frame $LF_1$ is corrupted to the extent that pointer 40 pointing to the beginning 32 of access unit $AU_2$ is not at hand.

It should be noted, however, that instead of a length indication, alternatively, an end pointer indication may be used to point to the end of the respective AU directly, i.e. independent of the pointer 40 pointing to the begin 32. The effect would be similar to the above-outlined advantages. The end pointer indication may, for example, comprise a pointer pointing from the afore-mentioned registration point, such as the leading end, of the logical frame into which the respective end of the respective AU falls, to the end of this AU. Additionally, the end pointer indication may comprise a LF indicator indicating into which of the following LFs the end of the respective AU falls, such as by counting the number of LFs starting from LF subsequent to the current LF. For sake of easing the below-presented description, according to the following embodiments a length indication is used. However, in these embodiments, the length indication is to be understood merely representative for an indication allowing for locating the end of the respective AU.

Figure 5:
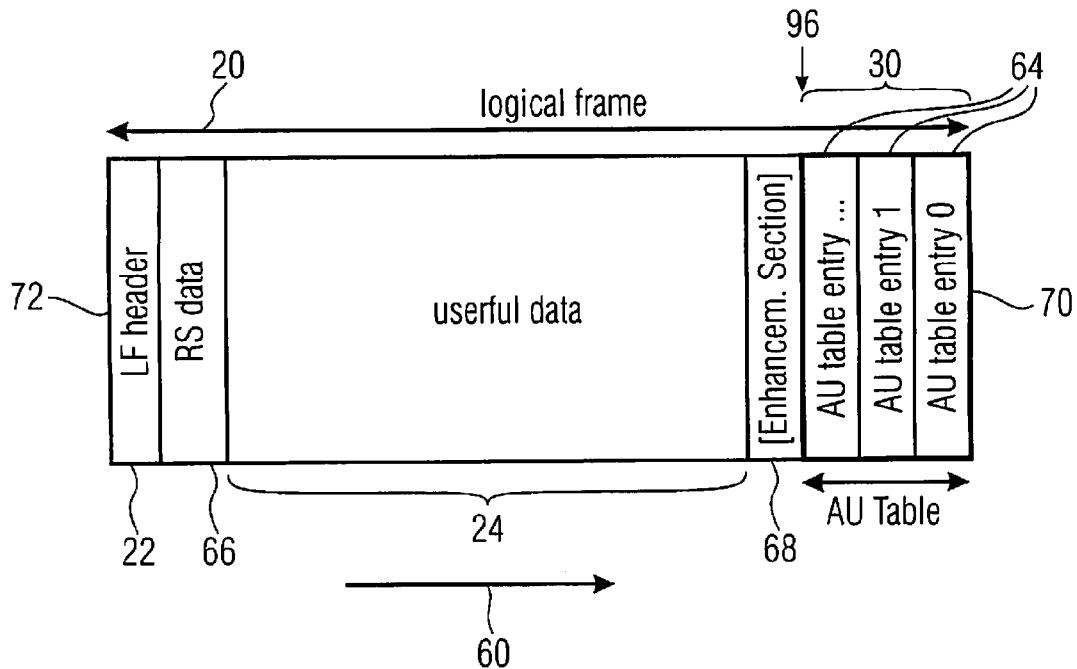
FIG. 5 shows a schematic diagram illustrating the structure of a logical frame in accordance with an embodiment.

As already mentioned above, the access unit stream preparator may be configured to provide each logical frame 20 with a logical frame header 22 indicating the length of the respective access unit table 30. In accordance with embodiments set out below in more detail, preparator 16 provides each access unit table 30 with an access unit table entry per access unit 28 the begin 32 of which falls into the respective logical frame 20, with the logical frame header 22 indicating the length of the access unit table 30 measured, for example, in number of access unit table entries having constant length each within the respective access unit table 30. Such a specific embodiment is described with respect to a DRM embodiment later with respect to FIG. 5. Briefly discussing FIG. 5, it is derivable from FIG. 5 that the logical frame 20 exemplary shown therein consists of a number of access unit table entries 64. As is also derivable from FIG. 5, the useful data section 24 may not completely cover the remaining portion of logical frame 20 except of logical frame header 22 and access unit table 30. Rather, as shown in FIG. 5, useful data section 24 may be offset, by a predetermined number of bytes or bits, from the logical frame header 22 and/or the access unit table 30, with the predetermined number being, for example, known to the decoder or transmitted to the decoder in an extra channel within transmission signal 38. In the example of FIG. 5, for example, FEC data 66—here, exemplarily RS (Reed Solomon) data—is, or may be, positioned between the logical frame header 22 and the useful data section 24 with this RS data 66 having a predetermined length, and an enhancement section 68 may be positioned between the useful data section 24 and the access unit table 30 with the latter either having a constant length, or, as it is the case with the following embodiment, a varying length which, for example, also depends in a known manner from the number of access units 28 the begin of which falls into the current logical frame 20, or the indication of the length of which is present within the enhancement section itself, but at the known border between enhancement section and access unit table.

Beginnings of the access unit table entries 64 may be spaced apart from the rear end 70—or, in an alternative embodiment, from the leading end—of the logical frame 20 in units of a constant length. Accordingly, the recoverer 54 may be configured to, in extracting the access unit table 30 of a logical frame 20, consecutively extract the number of access unit table entries 64, indicated by LF header 22, starting at the rear end 70 of the logical frame 20 or at a position within the logical frame 20, having a predetermined constant offset therefrom, with stepping through the access unit entries 64 in units of a constant length of these access unit table entries 64 from one access unit table entry to the next, in order to obtain, for each access unit table entry, the pointer 40 pointing to the respective begin 32 of a corresponding access unit 28. It may be advantageous if access unit stream preparator 16 fills in the access unit table 30 from the registered rear end, i.e. with beginning from the rear end 70 of logical frame 20. In other words, the first begin 32 of an access unit 28 falling into a respective logical frame 20 along the useful data insertion direction 60 is indicated in the access unit table 30 by means of a respective pointer within the first access unit table entry 64 from the rear end 70 of logical frame 20, i.e. the access unit table entry 64 nearest to, or bordering, the rear end 70 of logical frame 20. The begins 32 following in useful data extraction direction 60 follow along a direction contrary to the user data insertion direction 60. This is advantageous because preparator 16 may continuously construct the logical frames 20 rather than constructing them logical frame-wise at once.

As it is also the case with the embodiment described below, preparator 16 may provide each access unit table 30 with additional redundancy data allowing for an access unit table entry individual data corruption detection and/or correction. In particular, each access unit table entry 64 itself may comprise individual additional redundancy data. Each access unit table entry 64 may be provided with first redundancy data calculated over, and allowing data correction detection of, at least the pointer 40 and, optionally, the optional length indication indicating the length 62 of the respective access unit table entry 64. As a consequence, the recoverer 54 is able to check the correctness of the AUT entries individually, and a corruption of one AUT entry does not compromise the usability of another AUT entry of the same AU table. Further, as will be outlined in more detail below, the existence of the first redundancy data enables even to check for the validity or existence of a next AUT entry in line—when stepping through the AUT entries having a constant length—if, for example, the total number of AUT entries in unknown due to, for example, a corrupted LF header.

Additionally or alternatively, each access unit table entry 64 may be provided with second redundancy data calculated over, and allowing data corruption detection of, the content of the access unit associated with the respective access unit table entry 64. Thus, the correctness of each AU is detectable individually.

Further, in accordance with an embodiment, the first redundancy data is calculated over, and allows data correction detection of, the pointer 40, the optional length indication—optionally—and the second redundancy data of the respective access unit table entry 64.

Figure 4:
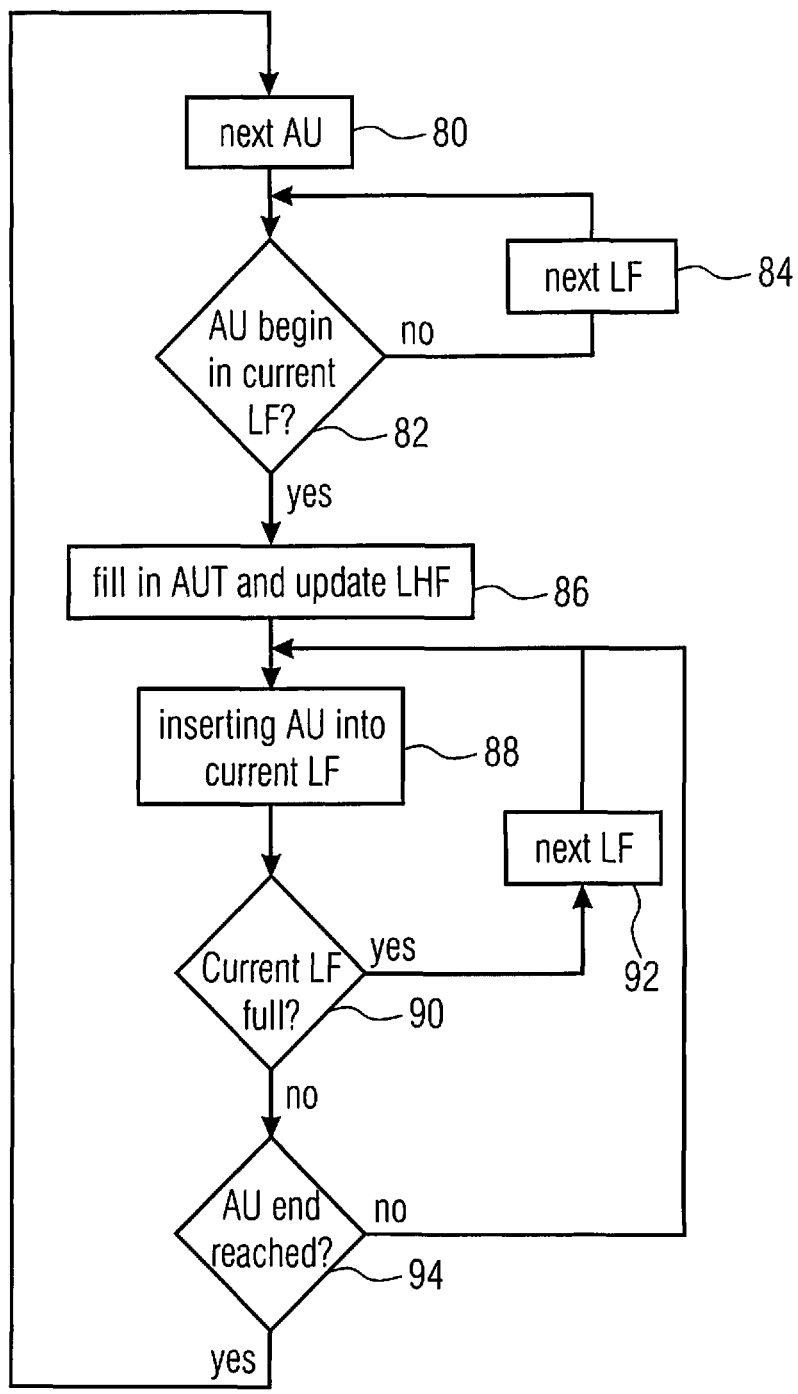
FIG. 4 shows a flow diagram of an access unit stream preparation performed by the access unit stream preparator in FIG. 2 in accordance with an embodiment.

With regard to FIG. 4, the mode of operation of preparator 16 in consecutively inserting the access units 28 into the logical frames 20 with inserting the pointers 40 into the access unit tables 30 in accordance with an embodiment is described. The process of FIG. 4 starts with preparator 16 turning to the next access unit 28 in step 80, in order to continue with consecutively inserting the access units 28 into the logical frames 20. At step 82, preparator 16 then checks as to whether the begin 32 of the current access unit 28 is to be placed within the current logical frame 20 or not. In this regard, it is noted that the useful data section 24 of the current logical frame decreases in size as soon as a further begin 32 of an access unit 28 falls into this current logical frame 20 as a further access unit table entry 64 is added to the access unit table 30 or, expressed alternatively, the length of the access unit table 30 increases. Because of this, preparator 16 may decide to place the begin 32 of access unit 28 into the following logical frame although, currently, the useful data section 24 of the current logical frame 20 would have the capacity to accommodate a small amount of further access unit content at the moment, and although preparator 16 seeks to, for example, seamlessly insert the access units 28 into the logical frames: as soon as the begin 32 would have been placed into the current logical frame, the remaining capacity of the useful data section 24 of the current logical frame 20 would not suffice to accommodate the amount needed to add the new access unit table entry 64 needed for indicating the pointer 14 to this new beginning 32 of the new access unit. An example for such a situation is exemplarily shown in FIG. 1 in case of the beginning 32 of access unit $AU_3$.

However, gaps like gap 58 may have other reasons the those exemplarily mentioned above, For example, the next AU data in line to be processed by access unit stream preparatory may simply not yet be available when the LF needs to be assembled and output to, for example, transmission stage 36 to ensure, for example, an uninterrupted transmission signal 38, in which case padding is introduced by preparator 16 as mentioned above.

If preparator 16 decides in step 82 to place the begin 32 of the current access unit 28 into the next logical frame, preparator 16 turns to the next logical frame in step 84 including, for example, closing the current logical frame and opening the next logical frame. The closing of the current logical frame may involve the preparator 16 computing the aforementioned additional redundancy data for data corruption detection/correction such as forward error detection/correction data to be described in more detail below, and sending out the logical frame to transmission stage 36. The opening of the next logical frame 20 may involve pre-setting the logical frame header to an initial state indicating, for example, that—until now—no access unit table exists within these next logical frames. After step 84, the process loops back to step 82 again.

If the check in step 82 yields that the current access unit 28 has to have its begin 32 placed in the current logical frame, the process proceeds to step 86 where preparator 16 fills-in the access unit table and updates the logical frame header. In particular, step 86 may involve the generation of the access unit table 30 within the current logical frame 20 in case, the begin 32 being subject of step 82 is the first begin 32 in the current logical frame. For this begin 32, a pointer 40 and, optionally, a length indication indicating length 62 is inserted into the respective access unit table entry 64, optionally including additional redundancy data for the access unit table entry 64 and, optionally, separately for the length indication. The update of the logical frame header 22 comprises increasing the number of access unit table entries indicated in this logical frame header 22.

As a consequence of the yes-option in step 82, preparator 16 also inserts the current access unit 28 into the current logical frame 20 in step 88. During that, preparator 16 continuously checks in step 90 as to whether the current logical frame 20 is full, i.e. no access unit data may be inserted into the useful data section 24 of the current logical frame 20. If this is the case, preparator 16 steps to step 92 in order to turn to the next logical frame 20, i.e. close the current logical frame and open the next logical frame. After step 92, the process loops back to step 88. If, however, the current logical frame 20 has not yet been completed or completely filled, preparator 16 performs another check continuously throughout the insertion in step 88, namely the check 94 as to whether the access unit currently inserted has been completely inserted, i.e. as to whether the end of the current access unit has been reached. If this is the case, the process loops back to step 80 in order to turn to the next access unit in sequence 14. If not, the process loops back to step 88.

After having described, rather generally, the embodiments for transmission chain 10, access unit stream preparator 16, decoder 50 and the access unit stream recoverer 54, as well as the other elements of FIGS. 2 and 3, in the following, embodiments of the present invention are described which shall represent a possibility to extend the transmission capability provided by DRM (DRM=Digital Radio Mondiale) to the extent that not only audio, text or data information is transmittable via DRM, but also video or a mixture of video and audio or other time-aligned textual information is transmittable via DRM in a manner so that the quality is acceptable at the receiving side. This transmission concept for extending the capability of DRM is called Diveemo in the following. Via Diveemo, education and information video programs may be transmitted via DRM, for example.

The embodiments for Diveemo, formerly known as DrTV, described below enable transmission of video and audio (possibly together with data services) via DRM (Digital Radio Mondiale). Possible applications may involve supplying citizens living abroad with information and education programs. The obtainable image and sound quality is more at the bottom end of customer expectations, which is, however absolutely sufficient for many fields of usage.

Diveemo forms an embodiment for exploiting the idea of enabling video services via DRM. The video services have to be adapted to the DRM standard, i.e. low available bit rates, DRM compliant service signalization and configuration, compliance with transmission structures provided by DRM, efficient handling of reception errors etc.

According to a further aspect, the Diveemo embodiments described below form a transmission scheme which uses a generic and DRM independent approach of transmitting a series of independent data packets ("access units") without the necessity of padding or additional overhead as interruption-free "serial data stream" with maximum usage of the bitrate of transmission channel, wherein simultaneously the temporal standards and transmission structures of the used transmission scheme, such as DRM, are used for embedding the information needed for decoding and up-synchronizing the receiving into the data stream, such that extraction of this information is quickly possible and, even with very adverse receiving conditions having many bit errors, only has little consequences regarding the loss of payload data.

Diveemo Functionality: Diveemo opens the door to a large range of new information and education services. It is an ideal platform to reach audiences scattered over a wide geographical area with a single transmitter, and to keep citizens living abroad informed and up-to-date about what is going on in the home country. This multi-media application may be based on the cost efficient global terrestrial broadcast standard DRM. DRM transmissions over shortwave have practically unlimited coverage possibilities ranging from 100 square kilometers up to well over 5'000'000 square kilometers depending on the transmission system. The Diveemo application offers the possibility of free-of-charge reception and is independent of gatekeepers and third party providers like satellites and cable networks. The possibilities are unlimited: one transmitter can reach millions of people anywhere and anytime.

Diveemo may provide a very efficient transport encoding and packetization while at the same time allowing receivers to robustly decode and quickly (re-) synchronize to the transmitted content. A video stream can be accompanied by one or more audio streams, allowing for synchronous multi-language support. The system also features all benefits of the DRM platform, like service selection by Unicode compatible labels, alternative frequency signaling and switching, announcements and warning/alert features, etc.

When combined with other DRM technologies like the very bitrate efficient text based information service Journaline®, accompanying textual background information on the programme, sub-titles and closed captioning services in a multitude of languages and scripts may be immediately available.

According to an embodiment, Diveemo may be implemented as outlined below. For the purposes of the following description, the [following] terms and definitions apply. In particular, for the purposes of the present document, the following symbols apply:

$N_x$ The value N is expressed in radix x. The radix of x shall be decimal, thus $2A_{16}$ is the hexadecimal representation of the decimal number 42.

$\lceil x \rceil$ The smallest integral value numerically greater than x. Sometimes known as the "ceiling" function.

$\lfloor x \rfloor$ The largest integral value numerically less than x. Sometimes known as the "floor" function.

x/y The result of dividing the value x by the value y.

MIN{a, . . . , z} The smallest value in the list.

Further, the order of bits and bytes within each description shall use the following notation unless otherwise stated:
in figures, the bit or byte shown in the left hand position is considered to be first;
in tables, the bit or byte shown in the left hand position is considered to be first;
in byte fields, the Most Significant bit (MSb) is considered to be first and denoted by the higher number. For example, the MSb of a single byte is denoted "$b_7$" and the Least Significant bit (LSb) is denoted "$b_0$";
in vectors (mathematical expressions), the bit with the lowest index is considered to be first.

The order of transmission for all numeric values defined in this document shall be MSb-first ('network byte order').

Multiplex Format

Diveemo may carry a series of 'access units' with audio, video, and potentially other content in an MSC subchannel. This MSC subchannel is configured to carry a data service in 'stream mode', i.e. not using the DRM Packet Mode. All access units belonging to one virtual stream of content (e.g. all those carrying the video data) are marked with a virtual stream identifier, called "AU Type". Access units with the same AU Type are carried in the MSC subchannel in their presentation order. Access units with different AU Types are carried in the MSC subchannel in interleaved form, such that those access units covering the same presentation times are transported grouped as closely as possible. Optionally the payload data in the useful data section and all header information is protected against transmission errors forward error correction (FEC) based on the Reed-Solomon algorithm. This is similar to the enhanced packet mode specification of the DRM Packet Mode to allow reusing the RS decoder as well as the virtual interleaver.

The DRM Signaling structure which Diveemo is based on, already enables the following features:
Up to 4 DRM Services defined in FAC (Fast Access Channel); DRM Services are virtual items presented to the user for selection; each DRM Service is of type audio (plus optional data service component as PAD—Program Associated Data) or a stand-alone data service
MSC (Main Service Channel) carries actual bitstreams in up to 4 MSC Streams; each MSC Stream carries one service component of constant bitrate (audio or Diveemo content), or up to 4 service components in packet mode
MSC Streams protection can be selected from up to 2 protection levels/code rates (defined per DRM Multiplex); EEP (Equal Error Protection) assigns one of those to an MSC Stream, UEP uses both per MSC Stream (with better protected bytes at the start of each Transmission Frame)
SDC (Service Description Channel) carries descriptive information for DRM Services (e.g. label, language, country of origin, etc.) and general signaling information (alternative frequencies, current time/date, etc.); it also carries entities describing the coding of audio (entity 9) and data (entity 5) service components; the latter may be used for Diveemo The MSC Data Transport Structure which Diveemo is based on, has the following features:
Transmission Frame (TF) and Transmission Super Frame (TSF) structure with constant bitrate data stream for Diveemo;
DRM30: TF=400 ms; TSF=1200 ms
DRM+: TF=100 ms; TSF=400 ms
TF within TSF is indexed: DRM30: 0-3; DRM+0-4;
In other words, the transmission frames represent portions of a certain length of the transmission signal and are synchronized within the transmission signal. The logical frames describe the content of the transmission frames.

Frame Structure

In the following it is described how to transport the Diveemo information in the MSC subchannel of a DRM ETSI ES 201 980 V3.1.1: Digital Radio Mondiale; System Specification. A DRM Logical Frame contains data for 100 ms (DRM mode A-D) or 400 ms (DRM mode E) worth of broadcast signal, respectively. If a DRM Logical Frame carries Diveemo information, it is called a Diveemo logical Frame.

The structure of a Diveemo Logical Frame 20 is shown in FIG. 5. It comprises the mandatory LF header 22, Reed-Solomon redundancy information in the optional RS Data section 66, the mandatory useful data section 24, followed by the optional Enhancement Section 68, and the AU table at the end 70.

The useful data section 24 contains the useful content (such as audio and video information) in form of access units 28. Each access unit 28 describes content that covers a certain presentation time. It directly follows the previous access unit in the useful data section 24 to form a continuous byte stream. This byte stream 14 of access unit information is split up into blocks of data. These blocks of data are then placed into the useful data section 24 of successive Diveemo Logical Frames 20. Therefore an access unit 28 can start anywhere in the useful data section 24, and may span multiple useful data sections 26 of consecutive logical frames 20.

For every access unit start 32 starting within the useful data section 24 of the current Diveemo Logical Frame 20, the AU Table section 30 carries one AU Table Entry 64. These AU Table entries 64 are ordered such that the "AU Table Entry 0" describing the first access unit starting within this useful data section 24 is carried at the end of the AU Table section 36, the "AU Table Entry 1" describing the second access unit starting within the useful data section 24 is carried just before "AU Table Entry 0", and so on.

LF Header 22 is composed of the following bits—mentioned in their order of transmission:
1 bit: enhancement flag
7 bit: number of AU table entries
8 bit: CRC calculated over the first byte of the LF Header, i.e. over the number of AU table entries.

The RS Data 66 is a block of Reed-Solomon redundancy information as described below. Naturally, another redundancy code, such as a systematic redundancy code, may be used to protect the LF and to be place into section 66, respectively.

Each AU Table Entry 64 is composed of the following bits—mentioned in their order of transmission, i.e. from left to right in FIG. 5:
3 bit: AU Stream ID (the "virtual stream identifier"). It takes values from 0-7; "7" may be reserved for carrying padding data); these bits are optional and may be left off in accordance with an alternative embodiment.
1 bit: Content Flag; if content is of type video: I-Frame flag; otherwise: rfa. This bit may also be missing in accordance with a different embodiment.
12 bit: AU Offset 40 (absolute index value, 0 indicating the first byte of the Diveemo Logical Frame 20). The AU Offset, thus, corresponds to the afore-mentioned pointer 40 measured from the leading end of the current logical frame 20 in bytes. The number of bits, i.e. 12, may be varied in accordance with another embodiment using, for example, shorter logical frames, and additionally or alternatively, AU Offset may measure the length of the pointer 40 in units other than bytes.
16bit: AU Length. AU Length, thus, corresponds to the afore-mentioned length 62. Again, the number of bits, i.e. 16, depends on the application and may be varied in accordance with an alternative embodiment. Additionally or alternatively, AU Length may measure the length of the respective AU in units other than bytes, and even alternatively, the registration point may be differently chosen so to point to the end of the respective AU in a different manner as indicated above.
16 bit: AU Timestamp (see detailed timing description below. This information within the AU table entry 64 is also optional and may be missing in accordance with other embodiments.
16 bit: AU CRC. AU CRC is calculated over the 'AU Length' bytes of the access unit content. Thus, AU CRC has also been mentioned above, namely as second redundancy data, and enables data corruption detection within the content of the AU associated with the respective AUT entry. Again, the number of bits is optional and may be varied.
8 bit: AU Table Entry CRC calculated over the first 8 bytes of this AU Table Entry, i.e. over AU stream ID, AU Content Flag, AU Offset, AU length, AU Timestamp and AU CRC. The AU Table Entry CRC has also been mentioned above as first redundancy data calculated over, optionally, length indication indicating length 62, pointer 40 and, also optionally, the second redundancy data. Here, the AU Table Entry CRC exemplarily also protects the additional information within the AU Table Entry. This is, of course, optional. This is also true for the number of bits spent for AU Table Entry CRC.

If the Enhancement Flag is set to 1, there is the Enhancement Section 68 inserted immediately before the AU Table 30. Otherwise, it is not. The enhancement section 68 may be used for future extensions, i.e. future functionalities. The Enhancement Section 68 has the following format or is composed of the following bits—mentioned in their order of transmission:
n×8 bit: Enhancement Section data
8 bit: CRC calculated over the last byte of the Enhancement Section
8 bit: length "n" of the Enhancement Section data Note that the static information is carried at the end of the Enhancement Section 68, so that the length of the Enhancement Section 68 can be derived at the decoder side and by access unit stream recoverer 54, respectively, starting from the well-known border 26 of the AU Table section 30.

Thus, the preparator 16 sets, in accordance with the Diveemo embodiment described now, the afore-mentioned bits within LF header 22, AU Table Entry 64 and the other bits of the logical frame as denoted above by using, for example, a process in accordance with FIG. 4.

Optionally, the content of the Diveemo Logical Frame or even multiple successive LF's together can be protected by Reed-Solomon Forward Error Correction (FEC). To calculate the Reed-Solomon code, redundancy information 66 is calculated over the LF Header section 22, the useful data section 24, the Enhancement Section 68 (if present) and the Table information 30 (if present). To increase the robustness of the FEC scheme, this input data to the Reed-Solomon algorithm is virtually interleaved as described below, i.e. preparator 16 calculates the redundancy data 66 of the systematic RS code by virtually interleaving the afore-mentioned data of the Logical Frame 20, but sends out the Logical Frame in an uninterleaved format, and the recoverer 54 may or may not check the correctness of, and correct, the information within a received Logical Frame—received in the correct order—by de-interleaving the respective portion of the received Logical Frame and check the thus interleaved Logical Frame data by use of the redundancy data 66.

The FEC scheme can be applied on the basis of each individual Diveemo Logical Frame 20, or on the basis of a DRM Transmission Super Frame, covering 3 (DRM mode A-D) or 4 (DRM mode E) Diveemo Logical Frames 20, respectively. Whether or not FEC protection is enabled, and the exact configuration of the FEC scheme may be defined by the application specific data carried in the SDC data entity type 5 of DRM. The Reed-Solomon algorithm may be defined by RS(255; 239; 8), i.e. generating 16 redundancy information bytes per 239 content bytes.

Figure 6:
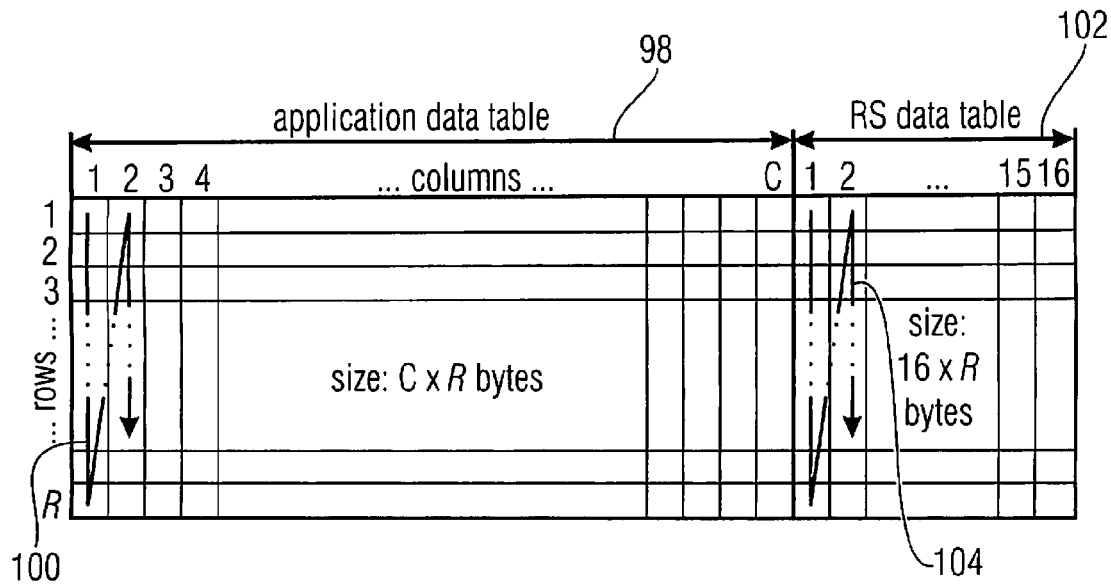
FIG. 6 shows a schematic diagram visualizing the virtual interleaving approach in accordance with an embodiment.

The diagram in FIG. 6 visualizes the virtual interleaving approach. That is, for the aforementioned virtual interleaving, preparator 16 may insert the relevant afore-mentioned LF data, i.e. all but the redundancy data itself, for example—into the application data table 98, column-wise along inserting path 100, with recoverer 54 emulating this procedure with the received data. The application data table 98 and RS data table 102 are juxta-positioned to each other column by column. Preparator 16 computes the RS data in RS data table 102 row-wise, i.e. each row of the combination of tables 98 and 102 forms one RS codeword, and preparatory 16 then reads-out the bits of table 102 column-wise along path 104 and fills the RS data section 66 in this interleaved order. The recoverer 54 deinterleaves the RS data 66 when filling table 102.

The following definitions apply to the values R and C in FIG. 6:
R: the number of rows of the Virtual Interleaving Table, permitted values are, for example, 1 to 511.
C: is implicitly given by the value of R since the number of bytes to be protected within the LFs is known The value of R may be signaled in SDC data entity type 14. The value of C can be calculated from the Application Data Table, which shall be just large enough to hold 1, 3 or 4 Diveemo Logical Frame(s), as signaled in the SDC.

The number of columns determines the overhead of the FEC data 66; the smaller the value of C the higher the overhead. The number of rows determines the interleaving depth and the block delay; the smaller the value of R the smaller the interleaving and the lower the delay before received data can be processed.

Implicit padding may be applied if less data is being transmitted to fill all cells in tables 98 and 102, respectively DRM Signaling
A Diveemo service may be signaled in the fast access channel (FAC) with the application id value "$27_{10}$" (5 bits).
The SDC data entity 5 may have the following structure:
1 bit: PM Flag: 0 (DRM Stream Mode)
3 bits: rfa
1 bit: Enhancement Flag
3 bits: Application domain: 0x00 (DRM application)
16 bit: Application ID: 0x5456 (ASCII for "TV")
m×8 bit: Application Data (see below)
Format of the SDC data entity 5 Application Data section:
2 bits: Major version, currently value 0
3 bits: Minor version, currently value 0
1 bit: FEC Flag (enabled: 1; FEC not used:0)
1 bit: Superframe Flag (FEC calculated over Diveemo Logical Frame: 0; over 3 or 4 LF, i.e. one DRM transmission super frame: 1)
9 bit: Number of rows for virtual interleaving (0 . . . 511; 0 only if FEC Flag=0)
n×8 bits: one or more AU Config Blocks (see below)
Each AU Config Block:
5 bits: Config Block length in bytes
3 bits: AU Stream ID (freely chosen to identify virtual stream of access units carrying same content type; It can take values from 0-7, while "7" is reserved for carrying padding data)
3 bits: Content type (0: video, 1: audio, other values: rfa)
5 bits: Codec ID (see below)
n×8 bits: Codec Specific Config (see below)

Codec Specific Config for HE AAC v2 with optional MPS audio, Codec ID 0x00: (content type 1)
1 bit: SBR Flag
2 bits: audio mode (see DRM Systems)
3 bits: audio sampling rate (see DRM Systems)
2 bits: MPEG Surround (0: none, 1:5.1, 2: 7.1, 3: in band)
Codec Specific Config for H.264/AVC video, Codec ID 0x00: (content type 0)
2 bits: aspect ratio (0:4:3, 1:16:9, other values: rfa)
11 bits: number of horizontal pixels per frame
11 bits: number of vertical pixels per frame
8 bits: number of frames per second in 1/4th steps.

Naturally, the just-outlined embodiments are merely illustrative and other codes and values may be used as well or in future.

Diveemo forms an embodiment for exploiting the idea of enabling video services via DRM. The video services have to be adapted to the DRM standard, i.e., low available bit rate, DRM compliance service signalization and configuration, compliance with transmission structures provided by DRM, efficient handling of reception errors etc.

Possible considerations/framework for Diveemo definition were that the signaling could be performed as SDC entity 5 (new data application type 'Diveemo') and that the transmission is performed as a synchronous data stream. The following constraints should be met: fixed frame length 400 ms (DRM30)/100 ms (DRM+), and fixed bytes/frame (bps) in the range: DRM30: 1 . . . 3598 bpf (71.960 bps) or DRM+: 1 . . . 2325 bpf (186.000 bps)

The following constraints/requirements in defining Content Formats should be met: Variable and dynamic assignment of audio/video bitrates within channel; Some minimum buffering requirement should exist; audio and video decoder should accept any flexible access unit size (bitrate equivalent); video decoder should be able to handle 'any' (dynamic) frame rate, i.e. the encoder may adjust dynamically to content; the video decoder should be able to handle missing frames so that I-frames might use splicing (transport in independent AUs); a Time stamp should be indicated per AU (overflow counter relative to common basic clock).

Formats which may be used for the video content within the AUs, are AVC/H.264 for video, and HE-AAC v.2 (+ Surround) or the upcoming MPEG Standard USAC ("Unified Speech and Audio Codec") for audio. Newer/more efficient codecs may be possible later.

An access delay sum when applying Diveemo to DRM, may stem from the following factors: DRM reception delay (FAC/SDC decoding, MSC interleaver, etc.), Diveemo FEC (interleaver) (optional), GoP size (to receive first 1-frame) of the video codec.

Further, video parameters which should be considered when transmitting video via Diveemo, are: I-frames take up to 50% of bitrate (critical for reception errors), only forward prediction should be used for stability reasons, and frame rate dynamically adoptable (by encoder).

Regarding afore-mentioned time stamps, the following considerations should be dome: common clock base for audio and video should be used; basic clock with a granularity of 1 ms seams to be a good compromise so that a max. jitter of 1/3 ms with typical frame rates (e.g. 15 fps) results; 16 bits for clock counter per AU should be OK (about 65 sec wrap around).

The presentation start delay which a Diveemo receiver faces, is: max. 1×GoP duration (tuned after first bits of i-frame)+1x GoP duration (transmission of following i-frame).

Further, when implementing the below-described Diveemo embodiment, the following should be considered: on initial synchronization, receiver would need to wait for Diveemo Header entry with active i-frame flag (→first video AU of a GoP and corresponding audio AU). To add redundancy the Diveemo Header could be mirrored at the end of a MSC-LF. Either completely, so a receiver can correct broken entries easily by comparing the two copies, or just the first byte of the Diveemo header +CRC including the first byte of each entry at the end of a MSC-LF. Each AU may be defined by its AU stream ID. AU stream ID 7 could be used to describe virtual AU data carrying padding bytes in the continuous stream of AU content. The time stamp value per AU could be based on 1 ms granularity (i.e. 16 spanning 65 seconds) as mentioned above.

Various Diveemo decoding flowcharts are described with respect to FIGS. 7a to 7m. The Diveemo decoding described with respect to theses figures may be performed by recoverer 54. Within FIGS. 7a-7m, decoding is broadly divided into two different types. Firstly, "Diveemo logical frame" decoding is described which, in short, is called DLF decoding. Secondly, "Diveemo superframe" decoding as described which, in short, is called DSF decoding.

In DLF decoding, one logical frame (LF) is buffered before the actual decoding starts as FEC is carried over one LF. In DSF decoding, depending upon the standard, three or four consecutive logical frames are buffered before the actual decoding starts as FEC is carried over three or four logical frames.

Firstly, the access unit stream recoverer 54 has to read some SDC parameters, i.e. side channel parameters within transmission signal 38, like a FEC flag (FECF) indicating as to whether the whole logical frames are protected by FEC, and a superframe flag (SFF) indicating as to whether the logical frames are grouped together into superframes, in which case the above DSF decoding is used, number of rows in the virtual interleaver, namely R as already denoted above and the like. Based on these service parameters, access unit stream recoverer 54 then begins the decoding process which is hereinafter described with respect to FIGS. 7a-7m.

Figure 7A:
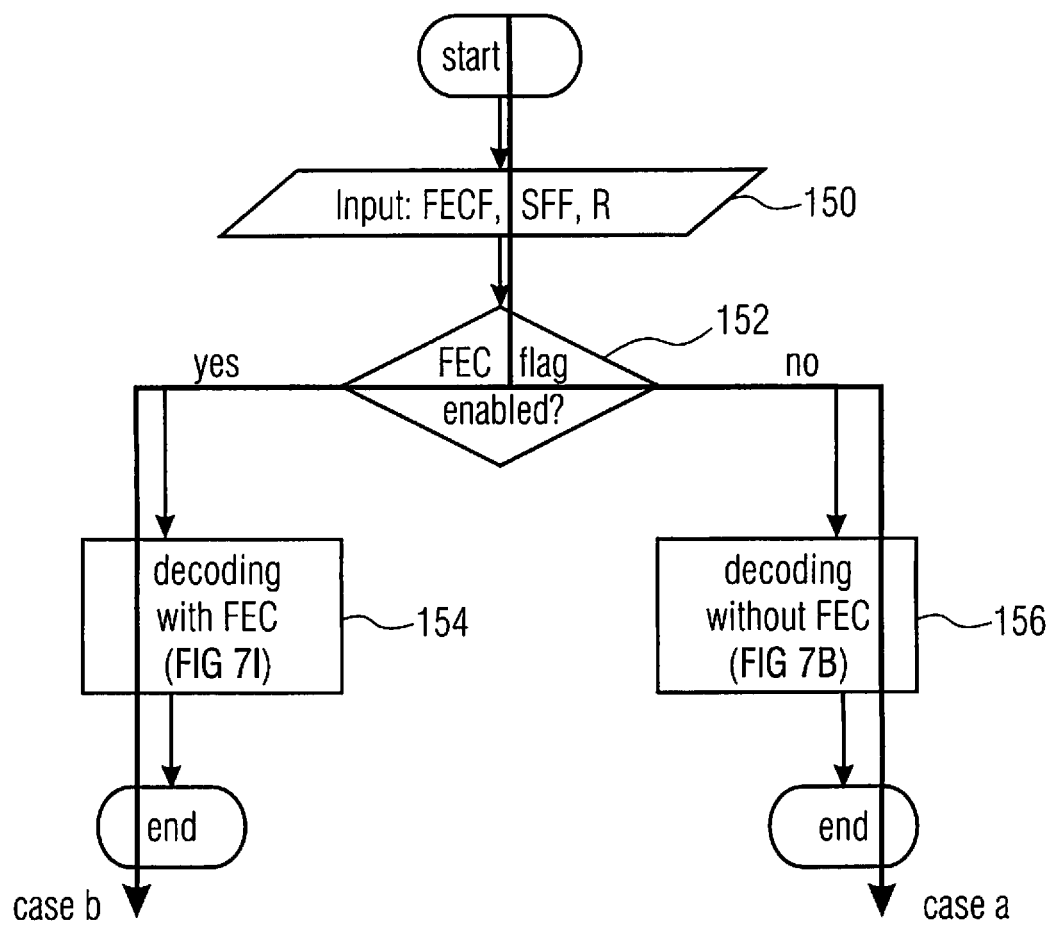
FIGS. 7a to 7m shows flow diagrams illustrating the mode of operation of the access unit stream recoverer in FIG. 3 in accordance with an embodiment.

As shown in FIG. 7a, the recoverer 54 intermittently, i.e. every LF in DLF, and every SF in DSF, performs steps the begin of which is indicated in FIG. 7a. At this beginning, the recoverer 54 has knowledge about the side channel information of transmission signal 38, namely the SDC portion thereof, namely about the SDC parameters FECF, SFF and R as indicated at 150. The process starts with recoverer 54 checking in step 152 as to whether FECF signalizes that FEC protection is used or not. If yes, preparator 16 has embedded the logical frames 20 into transport packets with FEC data 66 for protecting the content of the logical frames. If superframe grouping is used, the FEC code of the transport layer stream is defined over consecutive three or four logical frames as described above. If the FECF is enabled, decoding with FEC takes place at 154, otherwise decoding without FEC at step 156 takes place. The details regarding steps 154 and 156 are described with regard to FIG. 7b and FIG. 7i, respectively.

Figure 7B:
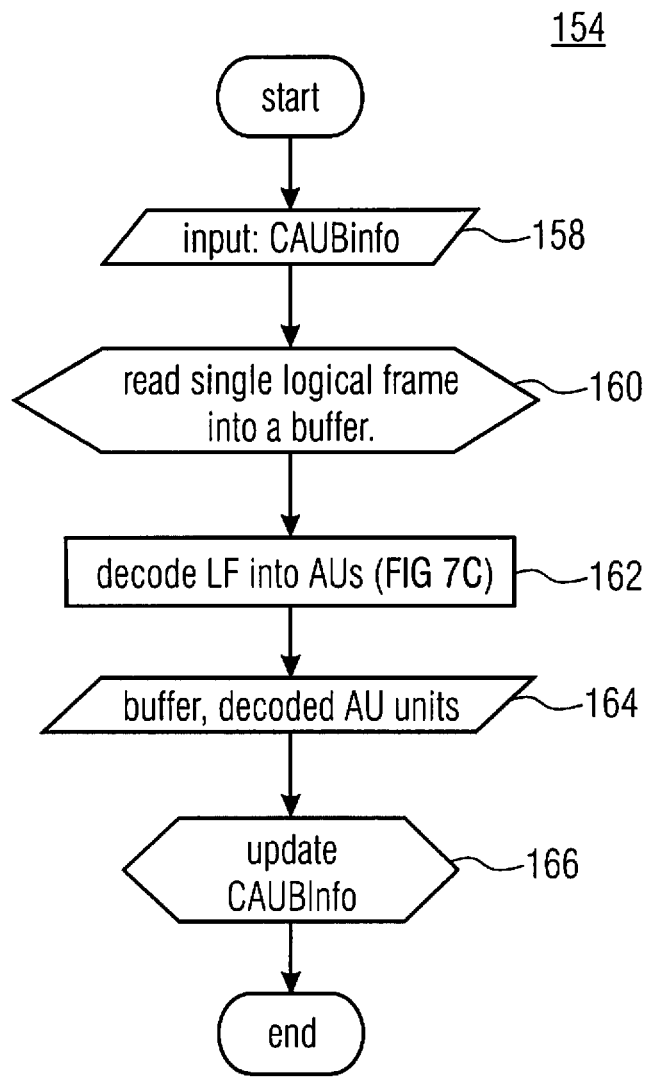

The decoding without FEC in step 156 is shown in more detail in FIG. 7b. The process of decoding a logical frame without FEC in process 154 starts with a-priori information known from the decoding of a previous logical frame as indicated at 158. This information is called CAUB. The CAUB info is a structure consisting of variables that help recover 54 in decoding, inter alia, the CAU, i.e. the carry-on AU, that is, the access unit the begin 32 of which lies in the logical frame 20 preceding the logical frame 20 currently under consideration. The following abbreviations are used in the following description and are known from CAUB info:

AU: Access Unit; in the following, the abbreviation AU is used to denote AUs the begin of which falls into the current LF, contrary to CAUs CAU: Carry-on AU;

CAUF: CAU Flag, i.e. a flag indicating the existence or non-existence of a carry-on AU, which extends into the current LF PCAUB: Partial CAU Bytes, denoting the bytes of CAU preceding the border between the current LF and the previous LF, i.e. the bytes of CAU already having been read.

LPCAUB: Length of PCAUB, i.e. the number of bytes or the length of, PCAUB

CAUSID: CAU Stream ID, i.e. the AU Stream ID value of CAU.

CAUL: CAU Length, i.e. the length of CAU, i.e. length 62 of FIG. 1, indicated by the length indication of the respective access unit table entry within the previous logical frame CAUCB: CAUCRC bits, i.e. CRC bits for enabling forward our detection within CAU transmitted within the afore-mentioned enhancement section.

Other values may belong to CAUB info as well, such as AU Content type, AU Timestamp, the value of the enhancement flag within the LFs etc.

As long as the steps of FIG. 7b are performed by recoverer 54, CAUB info stays static.

In step 160, recoverer 54 reads the next logical frame, i.e. the current logical frame, into an internal buffer of recoverer 54 not shown in FIG. 3. In the next step, namely step 162, recoverer 54 decodes this logical frame 20 into access units with this step being further described in FIG. 7c. Next, access unit stream recoverer 54 buffers the thus decoded access units in step 164 and updates CAUB info in step 166 in order to start again processing at step 158.

Figure 7C:
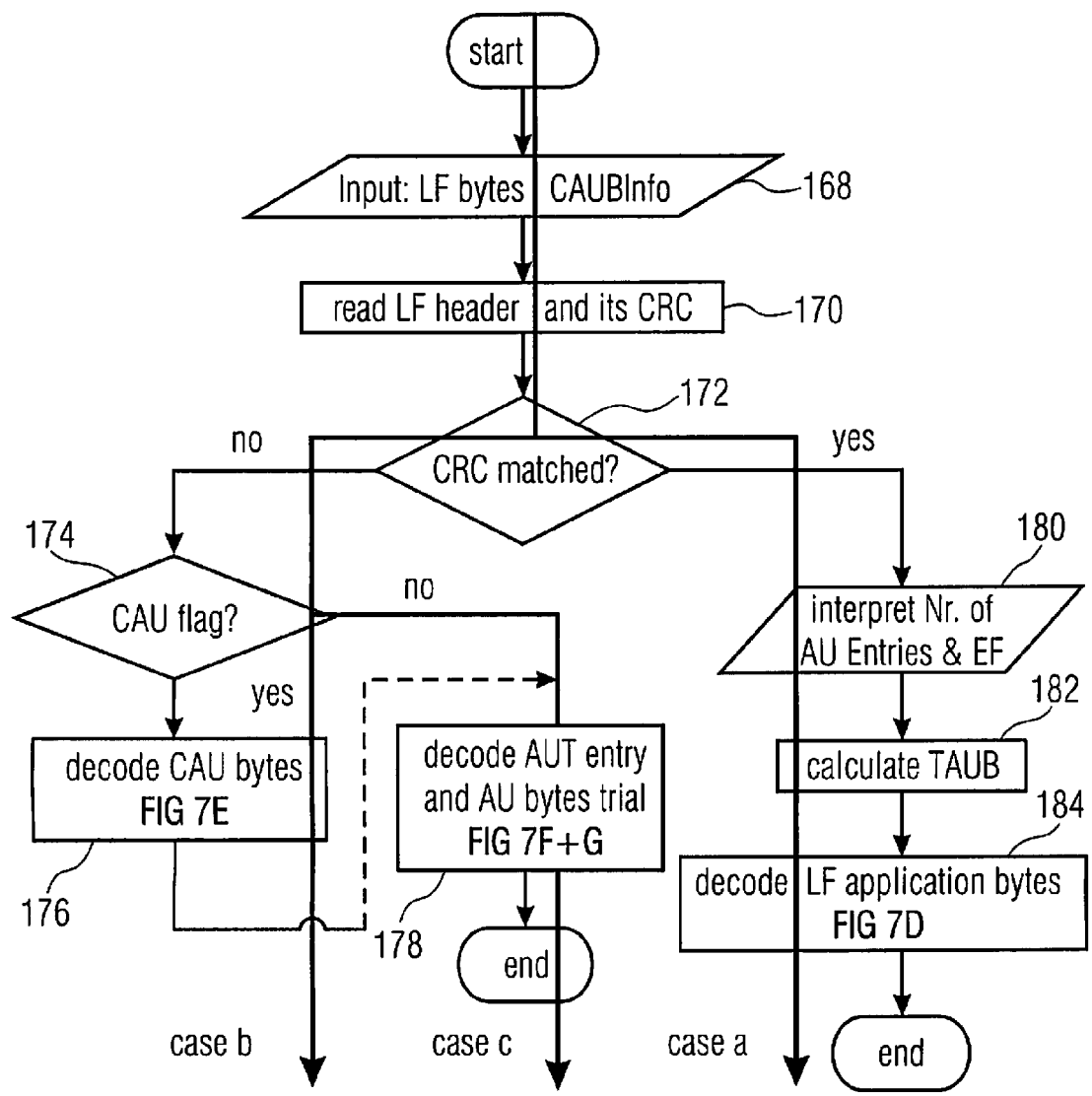

The process of decoding the current logical frame into access units, namely step 162, starts, as shown in FIG. 7c, with recoverer 54 knowing two things, namely LF bytes, i.e. the bytes of the current logical frame, and CAUB info. The number of bytes of the logical frames 20 is either fixed or otherwise indicated, such as varies by way of respective side information signaling within the afore-mentioned separate side information channel of transmission signal 38. In step 170, recoverer 54 reads the LF header and its CRC. In step 172, recoverer 54 checks the CRC as to whether the same matches the LF header info, i.e. the enhancement flag as well as the number of access unit table entries contained within the logical frame header 22. If the CRC does not match in step 172, recoverer checks in step 174 as to whether there is a CAU, i.e. recoverer 54 checks the internal CAU flag as to whether same indicates that there is an access unit 28 the begin 32 of which lies in any of the previous logical frames whereas the end of this access unit has not yet been reached. If this is the case, recoverer 54 performs in step 176 the decoding of CAU bytes. Step 176 is further explained in FIG. 7e. If, however, CAU flag turns out to be not enabled in step 174, recoverer 54 proceeds to step 178, where the current logical frame is discarded or, more advantageous—and this case is considered here, subject to a Decode AU Table Entries and Au bytes trial by locating valid AUT entries by evaluating the AU Table Entry CRC, whereupon the process loops back to step 158 in FIG. 7b. Step 178 corresponds to a concatenation of the process portions of FIG. 7f-7g. Analogously, as indicated by dotted lines, although the LF exploitation may stop after step 176, it is also possible that recoverer 54 proceeds after step 176 with trying to recover as many AUT entries as possible from the a-priori unknown (due to corruption of the LF header) number of actually present AUT entries.

If, however, the CRC check in step 172 results in a match between the CRC information and the LF header information, recoverer 54 proceeds with trying to extract information from the following portions of the current logical frame. In particular, as indicated at 180, if the CRC matches in step 172, recoverer 54 additionally exploits at least two information items provided in the correctly transmitted logical frame header 22 of the current logical frame 20, namely the number of access unit table entries of the access unit table of the current logical frame, and the knowledge about the value of the enhancement flag EF. Resulting from the knowledge of the number of access unit table entries within the access unit table of the current logical frame, recoverer 54 is able to obtain TAUB, i.e. the total number of access unit bytes. Resulting from the knowledge of EF, recoverer 54 knows about the existence or non-existence of the afore-mentioned enhancement section 68. In particular, in step 182, recoverer 54 calculates TAUB by multiplying the number of access unit table entries presented in the logical frame header 22 with the constant length common to all access unit table entries. Thereafter, in step 184, recoverer 54 decodes the bytes within a useful data section 24 of the current logical frame which procedure is outlined in more detail with regard to FIG. 7d.

Thus, the procedure portion shown in FIG. 7c creates three cases:
a) The LF header is correctly decodable and accordingly, the access units are to be decoded
b) The LF header is not decodable and accordingly, the access units may not be decoded, but CAU is present and may be decoded
c) The LF header is not decodable and accordingly, access units may not be decoded but an attempt to find out valid AUT entries may be carried out. Additionally, CAU is also not present and hence, not to be decoded.

The decoding of the LF application bytes within the useful data section 24 is described next with respect to FIG. 7d. When entering this process section, recoverer 54 has knowledge about LF bytes, i.e. the bytes of the logical frame, CAUB info, EF, TAUE, i.e.
the total number of access unit table entries, and TAUB, i.e. the total number of bytes of the access unit table as shown at 186. Recoverer 54 checks in step 188 CAUF to check as to whether there is a CAU or not. If yes, recoverer 54 decodes in step 190 the CAU bytes within the current LF, a step which is described further below with respect to FIG. 7e. After step 188 or 190, recoverer 54 proceeds to step 192 to check TAUE as to whether the number of access unit table entries is zero or not. If this number is zero, i.e. there is no access unit table within the current logical frame, the process of FIG. 7e ends. If not, however, recoverer 54 decodes in step 194 the AU table entries and decodes in step 196 the access unit bytes from the LF's useful data section. Step 194 is further explained with respect to FIG. 7f, and step 196 with regard to FIG. 7g. At the end of the process portion of FIG. 7d, recoverer 54 possesses knowledge about an updated CAUB info and has buffered versions of the access units as indicated at 198.

Figure 7D:
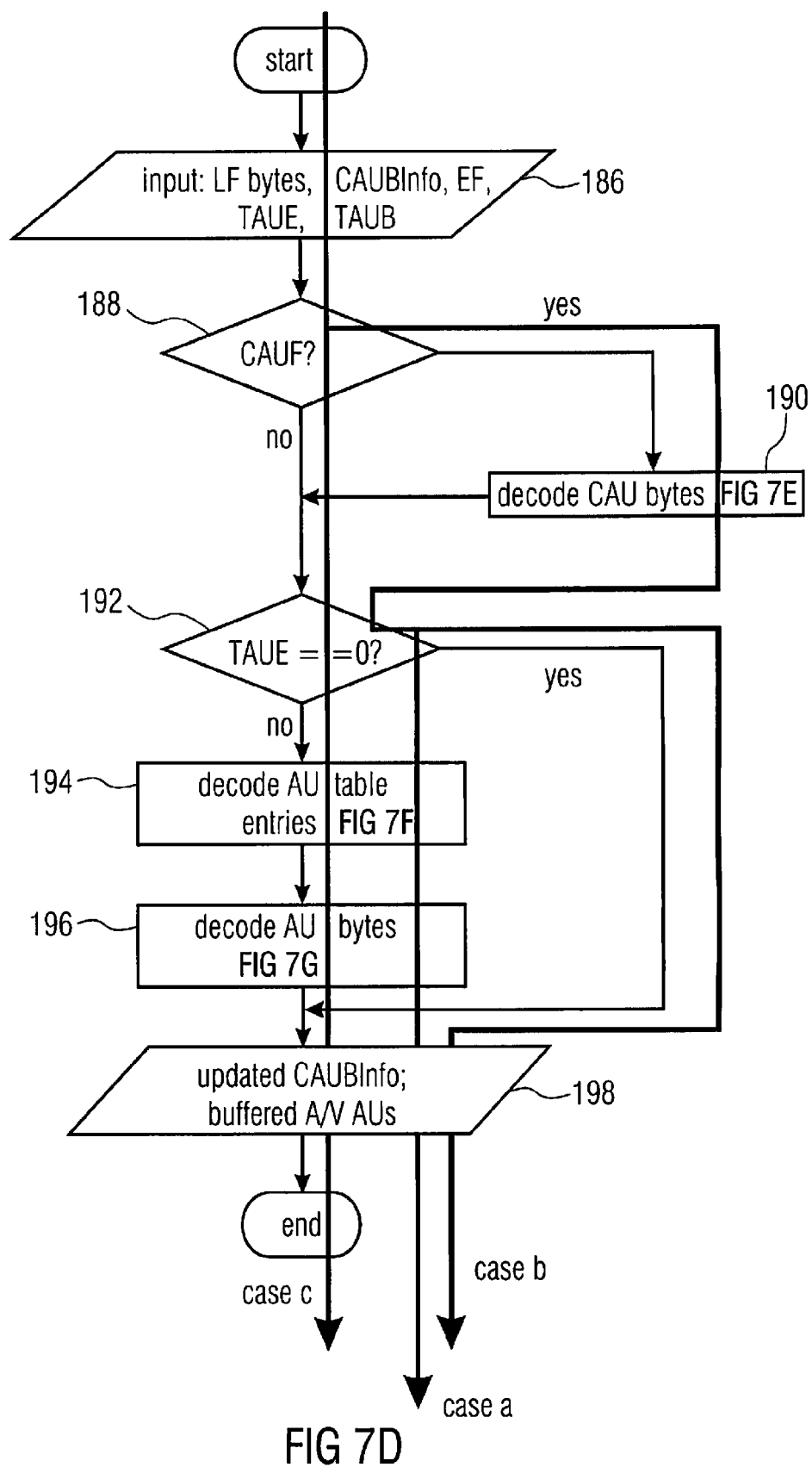

Thus, the process portion of FIG. 7d, pertains to the following cases which may occur:
a) the AU data within the useful data section 24 of the logical frame contains both CAU and AUs,
b) the AU data within the useful data section 24 of the current logical frame contains only CAU, or
c) the AU data within the useful data section of the current logical frame contains only AUs.

Figure 7E:
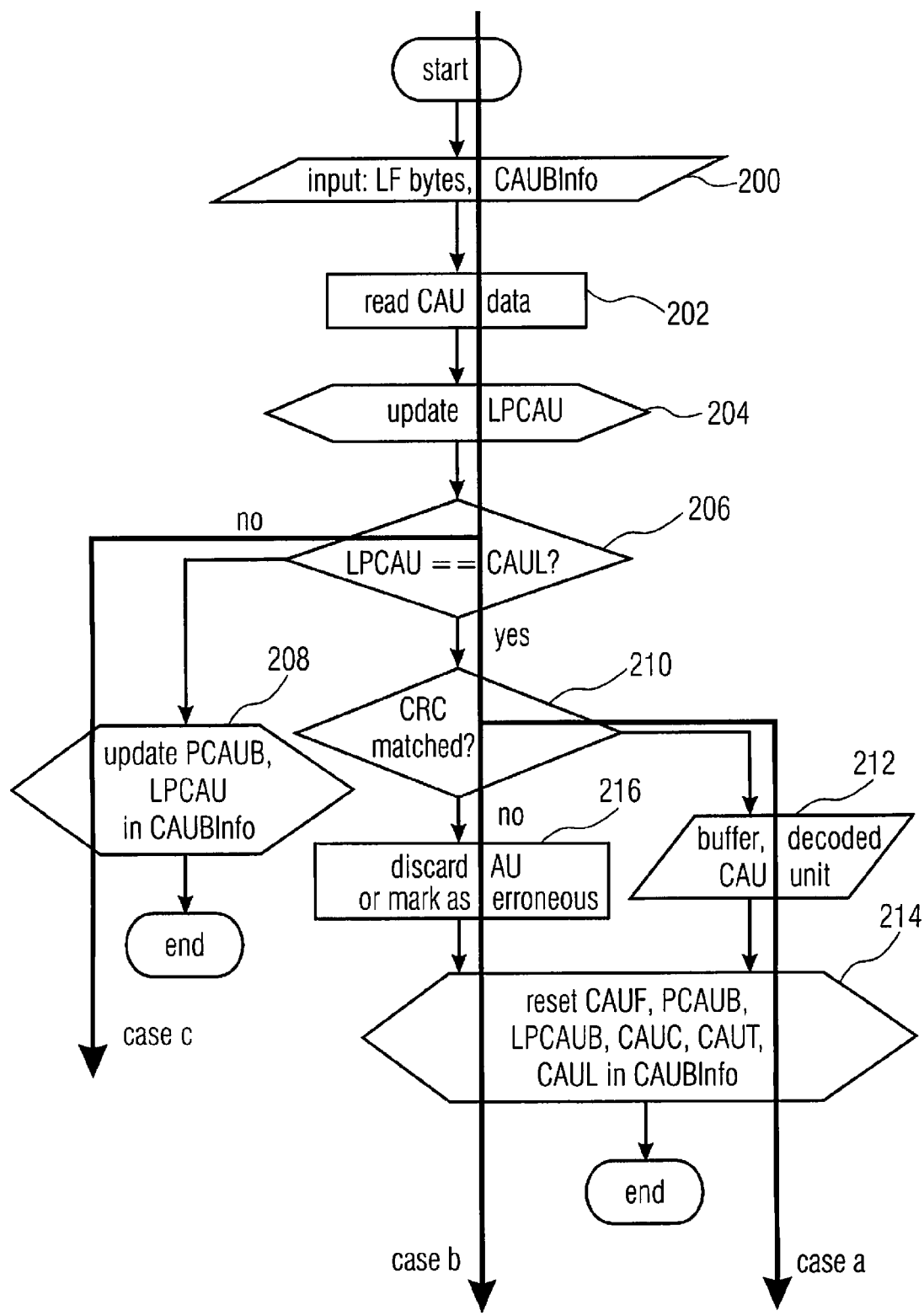

Next, the decoding of CAU bytes in steps 176 and 190 is described in more detail with respect to FIG. 7e. At the beginning of this process portion, recoverer 54 possesses already knowledge about LF bytes, i.e. the number of bytes within the current logical frame, and CAUB info as indicated at 200. At the beginning, recoverer 54 starts reading CAU data at step 202. Recoverer 54 is able to locate the beginning of the useful data section 24 of the current logical frame from where the reading in step 202 is to be commenced, since this starting point is constant over time over the logical frames due to the constant length of the logical frame header 22 and the knowledge about the existence of (see FECF), and the constant length of, the optional FEC data section 66. In particular, in step 202, recoverer 54 attempts to read as many bits from the beginning of the useful data section 24 of the current logical frame as belong to the CAU, i.e. the access unit extending into the current logical frame from the previous logical frame. Two cases may occur. Firstly, recoverer 54 may encounter the end of CAU before the end of the useful data section of the current logical frame. Secondly, recoverer 54 may encounter the end of the useful data section 24 of the current logical frame before the end of CAU. Recoverer 54 is able to forecast the situation based on two information, namely CAUL, i.e. the length of CAU known from any of the previous logical frames, in particular the respective access unit table entry of the respective access unit table therein, and the number of bytes of the logical frame along with the knowledge about the existence or non-existence of the enhancement section 68 (see enhancement flag) and about the length of this section 68 as derivable from the predetermined positioned within this section revealing the length of section 68—registered relative to the AUT—because this information also defines the maximum number of bytes available for a logical frame in case no access unit table exists. After having read the CAU bits, i.e. the portion of the useful data section 24 from beginning of that portion on, recoverer 54 updates in step 204 the internal state of LPCAU, i.e. the length of the part of CAU already having been retrieved from the sequence of logical frames so far. In step 206, recoverer 54 checks as to whether LPCAU equals CAUL, i.e. as to whether the whole CAU has been retrieved from the sequence of logical frames so far. If not, the CAU continues to extend to the next logical frame and recoverer 54 updates in step 208 PCAUB and LPCAUB in CAUB info accordingly, i.e. updates the information on the part of CAU already having been retrieved from the sequence of logical frames including the current logical frame. If, however, the check in step 206 reveals that CAU has been retrieved from the sequence of logical frames completely, i.e. that the end of CAU did fall into the useful data section 24 of the current logical frame, recoverer 54 checks in step 210 as to whether the CRC information on CAU is derivable from the respective AU table entry 64 within the logical frame into which the begin 32 of the CAU did fall, matches the CAU bits retrieved and buffered so far for the CAU. If this is the case, recoverer 54 buffers the decoded CAU unit in step 212 and resets in step 214 the parameters in CAUB info as to the extent that no more CAU currently exists. If, however, the CRC check in step 210 reveals that the CAU bits having been retrieved from the sequence of logical frames is corrupted, recoverer 54 discards this access unit CAU in step 216 and proceeds to step 214 where this process portion of FIG. 7e ends. Alternatively, recoverer 54 may mark CAU in step 216 as erroneous and pass same on to presentator 56 which, in turn, may be configured to derive useful content from the erroneous AU by other means such as AU internal FEC or CRC data or the like, or just by successfully parsing the AU falsely marked as erroneous due to a corrupted CAUCRC.

Thus, FIG. 7e addressed three different cases, namely
a) CAU starts in a previous logical frame having, for example, LF number n and ends in the current logical frame having, for example, number n+1, where CAUCRC matches with CAU byte, i.e. the CAU byte has been correctly retrieved from the sequence of logical frames.
b) CAU starts in any of the previous logical frames, such as logical frame having number n and ends in the current logical frame having, for example, number n+1, and CAUCRC does not match with CAU byte, i.e. the bytes having been retrieved for CAU or the CAUCRC value are corrupted.
c) CAU starts in any of the previous logical frames, such as logical frame having logical frame number n, but this CAU extends beyond the current logical frame having, for example, LF number n+1, and extends into and possibly ends in the next logical frame having, for example, logical frame number LF number n+2.

The process portion of decoding the access unit table entries in step 194 and inspecting the portion of the LF potentially corresponding to valid AUT entries in step 178 is discussed in more detail below with regard to FIG. 7f. When entering this process portion from step 194, recoverer 54 knows about TAUE, i.e. the number of access unit table entries within the current logical frame, and LF bytes, i.e. the bytes of the current logical frame, as indicated at 218. When entering this process portion from step 178, recoverer 54 does not know about TAUE, and recoverer 54 may set TAUE to the maximally possible number of access unit table entries within the logical frames which is, in the present case (due to the FL header spending merely a constant number—here, exemplarily 7—bits for indicating the number of AUT entries) 128.

Figure 7F:
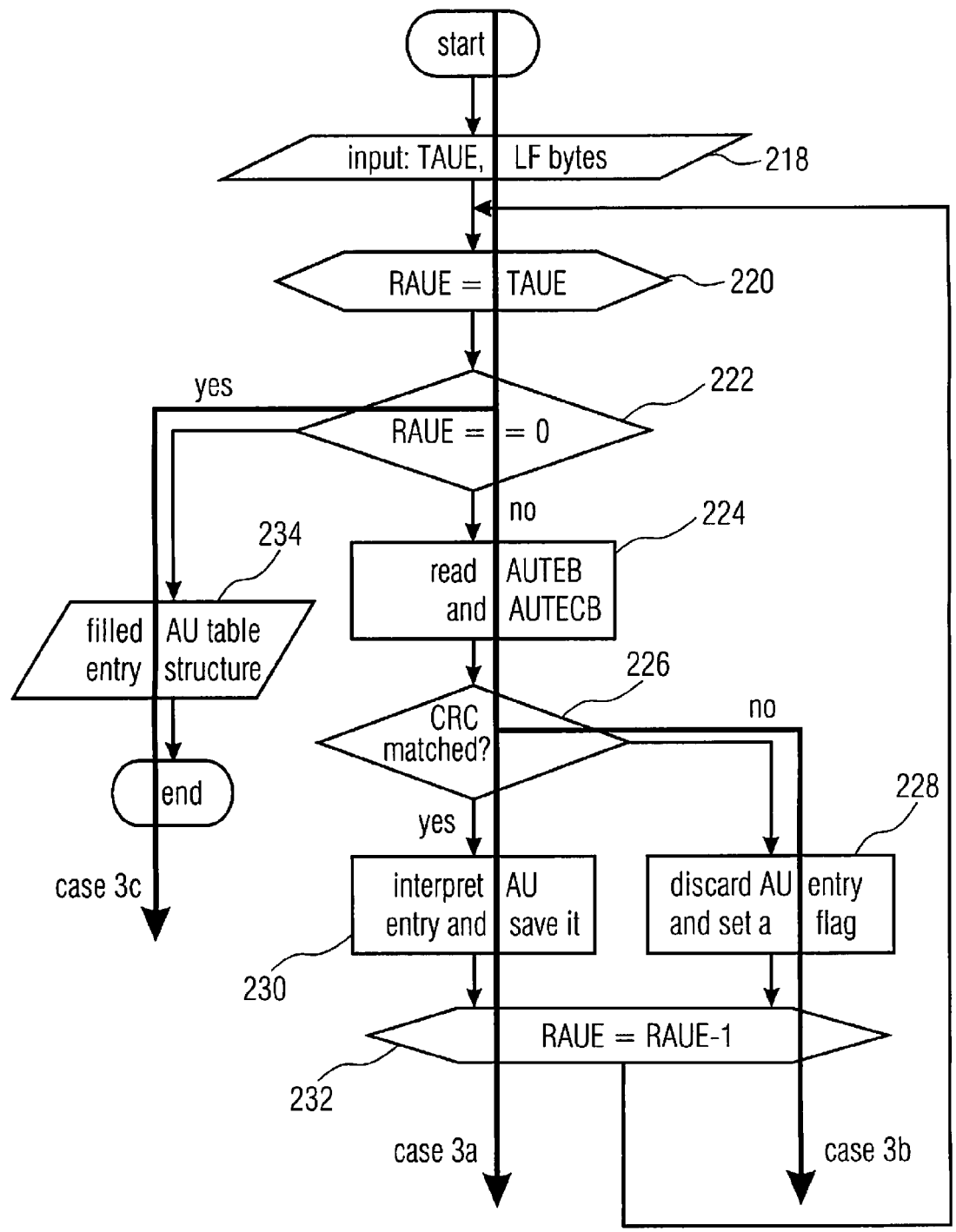

Within this process portion of FIG. 7f, recoverer 54 starts at step 220 with initializing an internal counting value, namely RAUE, i.e. the number of remaining access unit entries, to equal TAUE, the total number of access unit entries. Of course, it would be possible to count the processed entries with the counting value starting at one instead of decrementing the counting value.

After having checked in step 222 as to whether RAUE equals zero, i.e. as to whether there are no access unit table entries to be read left, the process proceeds with step 224 in case there are remaining access unit table entries to be read from the current logical frame and its access unit table, respectively, where recoverer 54 reads the AUTEB, i.e. the bytes corresponding to the access unit table entry in line, and the AUTECB, i.e. the access unit table entry CRC bits corresponding thereto. As has already been described above, the order at which recoverer 54 accesses the access unit table entry 64 may be from the rear end 70 towards the leading end 72 of the logical frame corresponding to the order of the access unit the beginning 32 of which is indicated in these access unit table entries 64. After step 224, recoverer 54 checks in step 226 the CRC of the access unit table entry just having been read in step 224 to check as to whether the access unit table entry data having been retrieved from the current logical frame is corrupted or not. If so, i.e. if the data is corrupted, recoverer 54 discards the respective access unit table entry 64 and sets a corresponding flag indicating the discarding in step 228. Alternatively, recoverer 54 may try to at least partially re-construct the invalid information through other means. For example, recoverer 54 may try to predict AU Offset from AU Length or vice versa (assuming, for example, seamless insertion of the useful data into section 24, and redo the CRC check with the respective predicted portion of the AU table entry replaced by the prediction result. By this manner, recoverer 54 may obtain, despite data corruption, a correct AU table entry matching with the corresponding CRC.

If the CRC for the current access unit table entry 64 matches the corresponding data, recoverer 54 interprets in step 230 the current access unit table entry 64 and saves it. It should be emphasized that the CRC match case is also an indication that the recoverer 54 just found a valid AUT entry 64. In even other words, when performing step 226 and having entered the process portion of FIG. 7f from step 178, recoverer 54 does not know in advance as to whether the currently inspected portion of the LF—located by exploiting the fact that the AU table is registered to the LF end and the AU table entries are positioned at constant pitch—actually forms part of the useful data section 24 or the enhancement section 68, or the AUT 30 respectively. Recoverer 54 may use the CRC match as a sufficient check result to interpret the currently inspected portion of the LF as a AUT entry 64. Alternatively, recoverer 54 may perform additional tests, such as plausibility checks, depending on which the current, possible AUT entry is regarded as valid or invalid in case, the LF header was corrupted. For example, the beginning 32 of the AU of the just found AUT entry 64 should lay after the end of the preceding AU and, the other way round, the end of the AU of the just found AUT entry 64 should lie before the end of the subsequent AU, and accordingly, if any of the plausibility checks results in a contradiction, current putative AUT entry is rejected and regarded as invalid.

After step 230, recoverer 54 knows about the beginning 32 of the corresponding access unit associated with the current access unit table entry 64 as well as, optionally, about the length 62 thereof. Regarding the further contents of the access unit table entries 64, reference is made to the above discussion of such additional options. Irrespective of the CRC match check in step 226, recoverer 54 decreases after any of steps 228 and 230 in step 232 the internal counter state RAUE by one and loops back to step 222. As soon as this check 222 reveals that the remaining number of access unit table entries 64 to be retrieved from the access unit table 30 of the current logical frame is zero, the process portion of FIG. 7f ends with recoverer 54 having filled the internal replica of the access unit table 30, i.e. the access unit table entry structure as indicated at step 234.

In other words, the process portion of FIG. 7f is entered by recoverer 54 if any access unit table exists within the current logical frame, i.e. when any access unit table entry 64 exists, or in order to assess as to whether any AUT entry 64 exist because the existence or non-existence (and number) of AUT entries is not known. It might be possible that CAU may take the whole logical frame so that in this case, for example, recoverer 54 may not enter the process portion of FIG. 7f. Following different cases are envisioned in the process portion of FIG. 7f:
a) the current access unit table entry and its CRC matches (and all plausibility checks have passed)
b) the current access unit table entry and its CRC does not match (or the plausibility check fails)
c) all access unit table entries—all entries known to be existent from the LF header, or all possible, merely presumptively existent, AUT entries (due to corruption of the LF header)—have been processed irrespective of their CRC having matched or not matched (cases a and cases b), wherein condition c is also the exit condition for this process portion of FIG. 7f.

It should be noted, that the reason for recoverer 54 being able to read AUTEB and AUTECB independent from any of the previous access unit table entries of the same access unit table of the current logical frame having been corrupted or not, is that all access unit table entries are of the same size, and that the access unit table 30 is registered with its rear end to the rear end 70 of the current logical frame so that recoverer 54 is able to locate the access unit table entries in any case. That there are alternatives, is already mentioned above.

Further, owing to the additional redundancy data by which the access unit table and the current logical frame is provided, enabling an access unit table entry individual data corruption check, an access unit table entry which has been transmitted without errors at the decoding side, may be evaluated by recoverer 54 independent from the success or dismiss in transmitting any of the other access unit table entries.

Figure 7G:
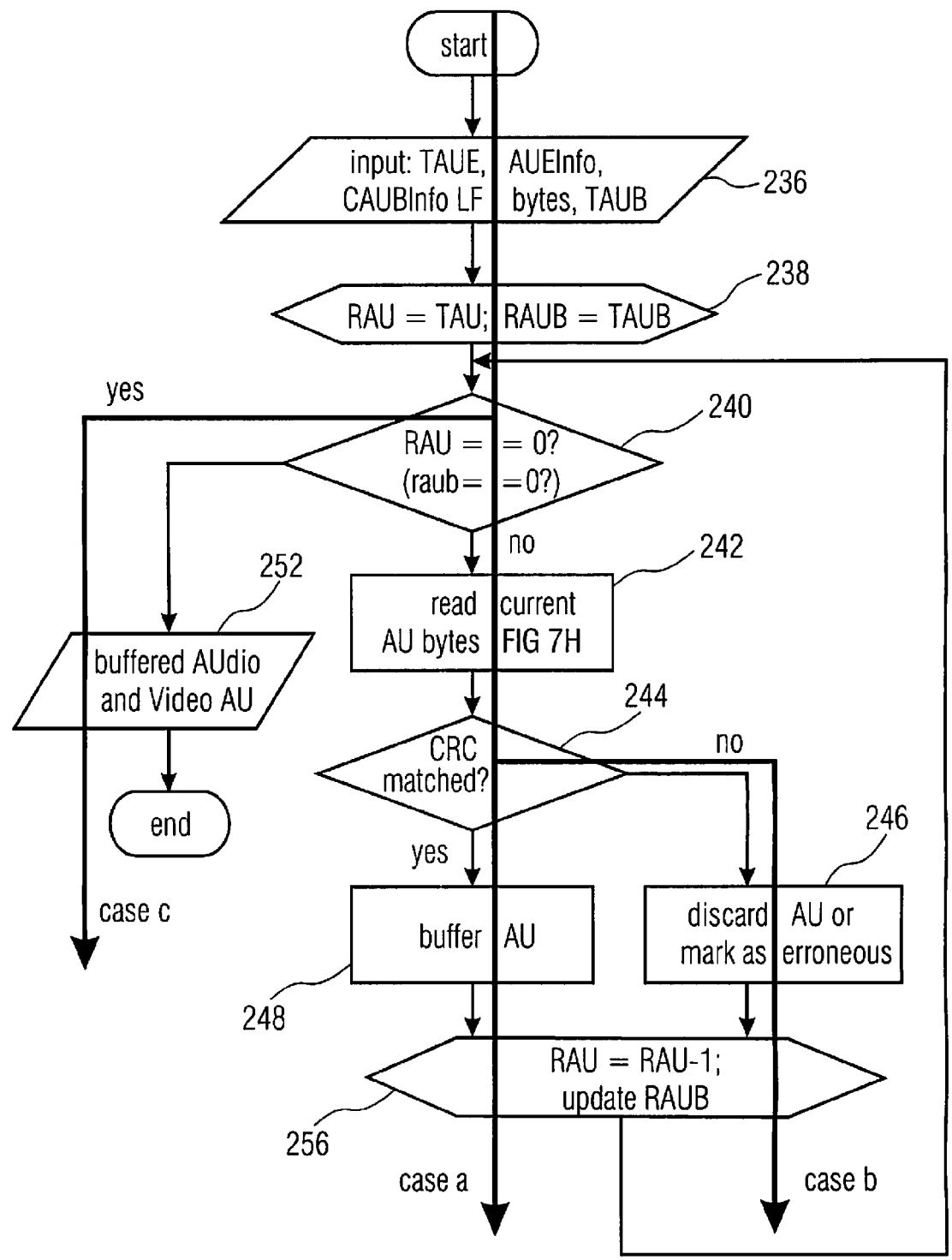

Next, with regard to FIG. 7g, details of the decoding of AU bytes in step 196 or 178 is described. When entering this process section, recoverer 54 is aware of the following information: TAUE, i.e. the total number of access unit table entries, AUE info, i.e. the content of the access unit table entries of the current logical frame as well as previous logical frames, CAUB info, LF bytes and TAUB, i.e. the total number of bytes available in the useful data section 24 of the current logical frame for the access units 28 the begin 32 of which falls into the current logical frame, with this pre-knowledge possession being indicated at 236. The recoverer 54 knows about TAUB due to the following reason: recoverer 54 knows that the access unit data pertaining access units the begin of which falls into the current logical frame 20 extends from the begin 32 nearest to the leading end 72 of the logical frame 20. This corresponds to the position pointed to by pointer 40 of the access unit table entry 64 which has been received with no data corruption and the earliest time in the process portion of FIG. 7f—or has been obtained, although being corrupted, by FEC as described later on with respect to DSF or DLF decoding. The end of the useful data section 24 is known to recoverer 54 based on the logical frame header information, i.e. the number of access unit table entries 64 along with indication (see LF header) of the existence or non-existence of the enhancement section 68 directly abutting AU table 30 and being positioned between the useful data section 24 and the access unit table 30, as well as the length of section 68 as derivable from the byte within this section immediately adjacent to—or, alternatively, having a predetermined offset from—the border of the AUT 30 facing section 68. If the latter information is not available, i.e. neither the number of AUT entries nor the existence or non-existence of section 68, recover 54 may restrict TAUB to measure the sub-part of the useful data section 24 extending from the aforementioned left-most beginning 32 pointed to by any of the validly found AUT entries and the last, i.e. right-most beginning 32 pointed to by any of the validly found AUT entries since this portion merely contains non-CAUs.

At the beginning of the process portion of FIG. 7g, recoverer 54 initializes in step 238 two internal parameters, namely RAU, i.e. the number of remaining access units not yet having been processed in the process section of FIG. 7g, and RAUB, i.e. the number of remaining AU bytes not yet having been read from the useful data section 24 of the current logical frame. Both parameters are set equal to TAU, i.e. the total number of access units the begin 32 of which falls into the current logical frame with this number being known from the logical frame header, and TAUB, respectively. At step 240, recoverer 54 checks as to whether RAU equals zero, i.e. as to whether there are access units to be processed, having its begin 32 within the current logical frame, left. If not, recoverer 54 proceeds at step 242 with reading the bytes of the current access unit from the useful data section 54 of the current logical frame wherein the step is described in more detail below with regard to FIG. 7h. Thereafter, recoverer 54 checks in step 244 as to whether the CRC associated with the current access unit matches the data of the current access unit read in step 242. If this is not the case, recoverer 246 discards the current access unit in step 246, or, as already outlined above, marks this AU as erroneous and passes it on for further a processing/trail. If, however, the CRC matches the current access unit, the process of FIG. 7g proceeds with recoverer 54 buffering the current access unit in step 248 for sending same out to the present data 56, for example. After any of steps 246 and 248, recoverer 54 updates in step 250 the internal states of RAU and RAUB. In particular, RAU, i.e. the number of access units to be processed, is decreased by one, and RAUB, i.e. the number of access unit bytes available in the useful data section 24 is updated, i.e. it is decreased by the number of bytes of the currently processed access unit or, is differing therefrom, to a difference between the rear end of the useful data section 24 and the begin 32 of the next access unit to be processed. As an exceptional measure, recoverer 54 may set RAUB to zero when encountering the end of the useful data section 24.

After step 250, FIG. 7g loops back to step 240 in order to process the remaining access unit to be processed and beginning within the current logical frame.

As soon as the check-in step 240 results in RAU being equal to zero or RAUB being equal to zero, recoverer 54 ends the process portion of FIG. 7g having the successfully received access unit buffered as indicated in step 252.

With regard to FIG. 7g, it is noted that the above description of FIG. 7g neglected the fact that some of the number—the number maximally representable by, or the number correctly conveyed by, the LF header—of access unit table entries may have been corrupted or not and that, accordingly, a respective flag may have been set in step 228 in FIG. 7f. In the above discussion of FIG. 7g, for example, TAU may already have been decreased by this number of corrupted access unit table entries, so that TAU merely stands for the number of access units the begin of which falls into the current logical frame and for which the associated access unit table entries were usable/valid.

Within the description of the process portion of FIG. 7g, again, three cases were differentiated, namely
a) the re-assembled AU content from the useful data section 24 for the current access unit matches the associated CRC,
b) the re-assembled AU content from the useful data section 24 for the current access unit and the associated CRC do not match,
c) all AUs have been processed or all data in the useful data section 24 has been processed, which is the exit condition for the process section of FIG. 7g.

Figure 7H:
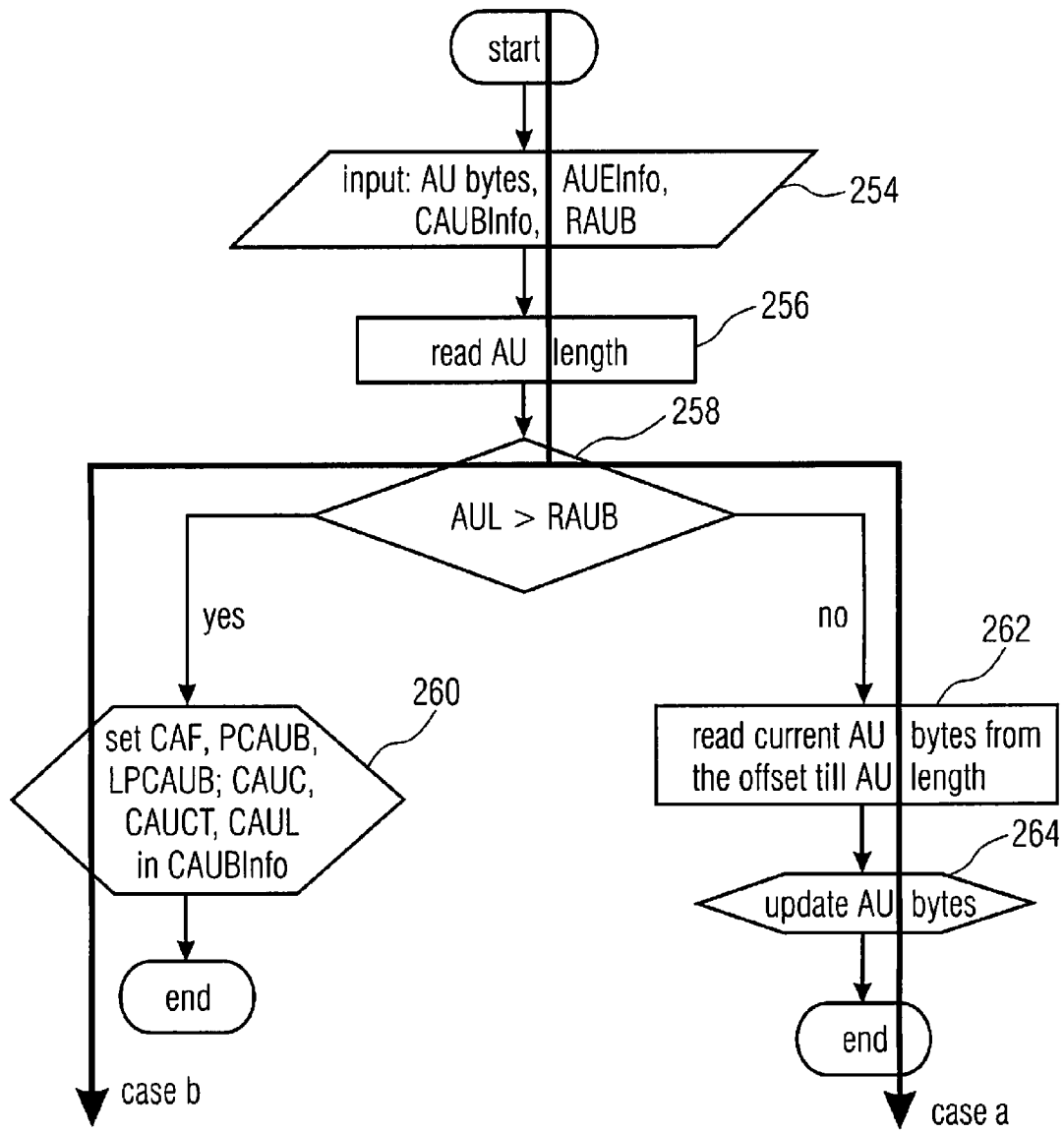

In FIG. 7h, the process portion as shown entered by recoverer 54 for reading the bytes of a current access unit in step 242. When entering this process portion, recoverer 54 may exploit the following information as indicated at 254, namely AUE info, CAUB info and RAUB. Firstly, recoverer 54 extracts the length of the current access unit in step 256 from the associated access unit table entry. In step 258 recoverer 54 checks as to whether AUL, i.e. the length of the current access unit, is greater than RAUB, i.e. the number of remaining bytes within the useful data section 24. If the answer to question 258 is yes, recoverer 54 sets in 260 parameters in CAUB info accordingly. In particular, in step 260, recoverer 54 sets CAUF in order to indicate that there is, again, a CAU, i.e. an access unit extending into the following logical frame. LPCAUB denotes the number of bytes of the CAU already having been retrieved from the current logical frame, i.e. the length of PCAUB. CAUL is the length 62 of the CAU and CAUC is the CRC of the CAU.

If, however, the current access unit fits into the remaining portion of the useful data section 24, recoverer 54 reads in step 262 the bytes of the current access unit until the end of the current access unit as indicated by its length 62, i.e. AUL. Thereafter, recoverer 54 updates the AU bytes.

Thus, the following cases were differentiated in FIG. 7h:
a) all bytes corresponding to the current access unit could be read from the current logical frame
b) not all bytes of the current access unit could be read from the current logical frame, i.e. the current access unit continues or becomes a CAU.

Figure 7I:
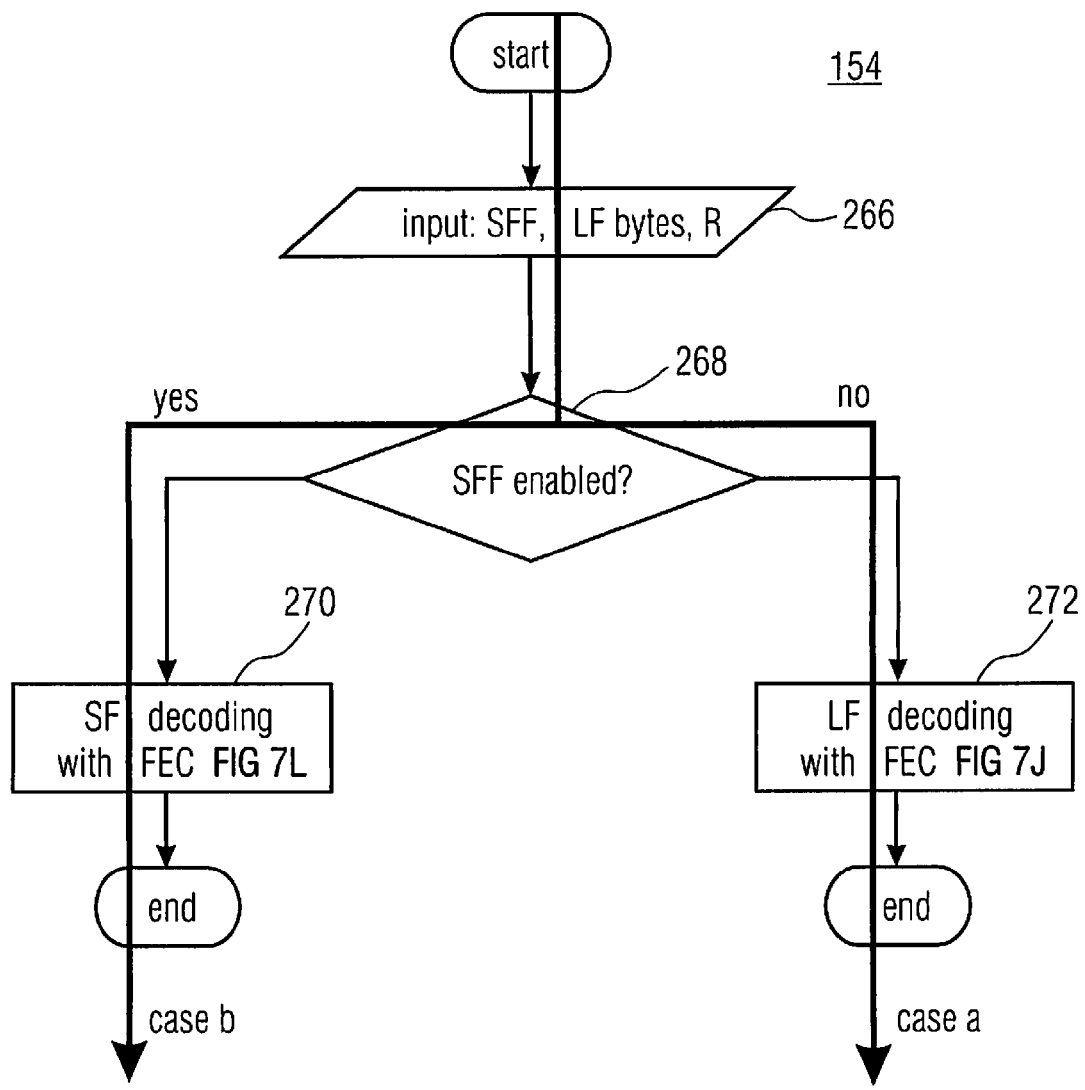
Figure 7J:
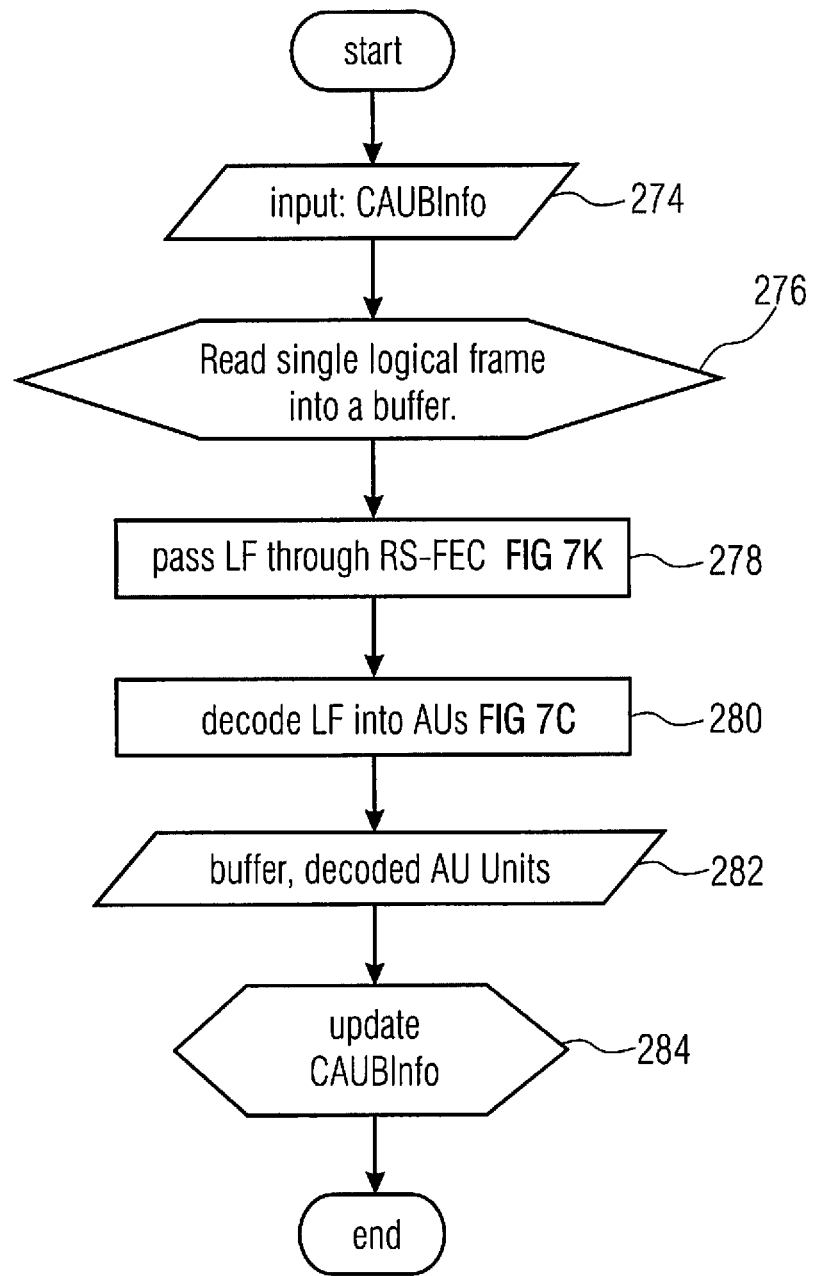

With regard to FIG. 7i, the process portion performed by recoverer 54 is shown for the case that the FEC flag turned out to be enabled in check 152. In other words, FIG. 7i exemplifies the decoding with FEC in step 154. In this case, recoverer 54 has, as indicated at 266 access to the flag SFF, LF bytes and R. In step 268, recoverer 54 checks as to whether SFF is enabled. If so, recoverer 54 proceeds in step 270 with SF decoding with FEC, and otherwise in step 272 with LF decoding with FEC. The first process portion of step 272 is shown in FIG. 7j. With knowing about CAUB info as indicated at 274, recoverer 54 reads a single logical frame into an internal buffer at step 276 and subjects the single logical frame to an RS-FEC at step 278. Thereinafter, this logical frame is subject to decoding into access units in step 280 just as done in step 162 as described with respect to FIG. 7c. Thereafter, the decoded access units are buffered in step 282 and the CAUB info is updated at 284.

That is, in case of LF decoding with FEC, the current logical frame is additionally passed through an RS forward error correction/decoding before the actual logical frame decoding into access units commences.

Figure 7K:
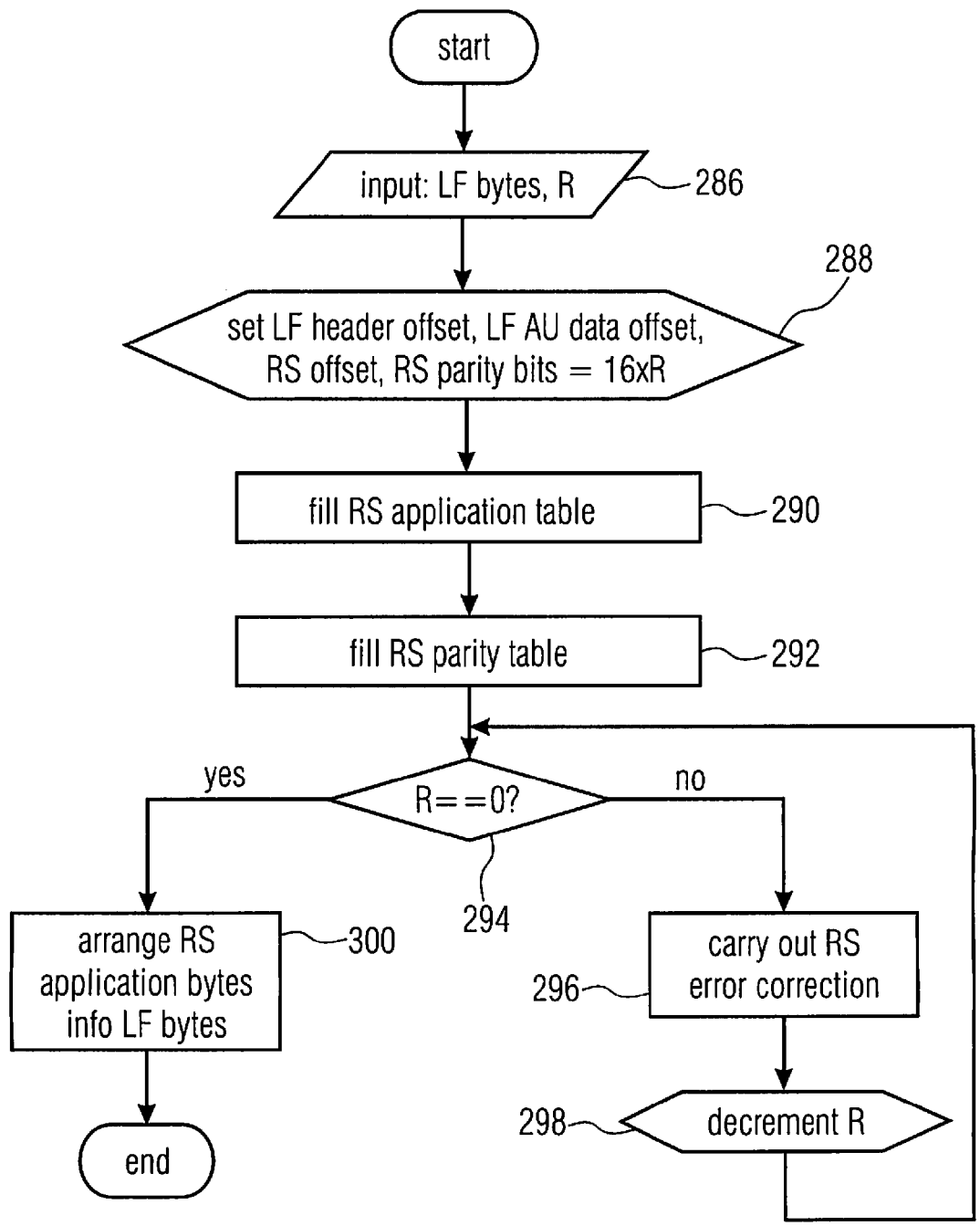

Subjecting the logical frame through RS-FEC in step 278 is exemplified further in FIG. 7k. In particular, based on the knowledge about LF bytes and R, as indicated at 286, recoverer 54 sets in step 288 the LF header offset, the LFAU data offset, RS offset, and the RS parity bits=16+xR and fills in, in steps 290 and 292, the RS application table 98 and RS parity table 102, respectively. After having checked as to whether R equals zero in step 294, recoverer 54 carries out RS error correction at step 296, if this is not the case and decrements R at step 298 whereupon the process loops back to step 294. If the checked step 294 reveals that R equals zero, the RS application bytes within the application data table 98 are read out in the de-interleaved sense to yield the LF bytes in step 300. If RS FEC succeeds in correcting the row R then the RS FEC may be configured to return the number of the symbols corrected and update the row with the corrected bytes, and to, if it fails, return minus one and retain the row symbols as it is. However, other implementation s are possible also. Further, different FEC codes may be used.

Figure 7L:
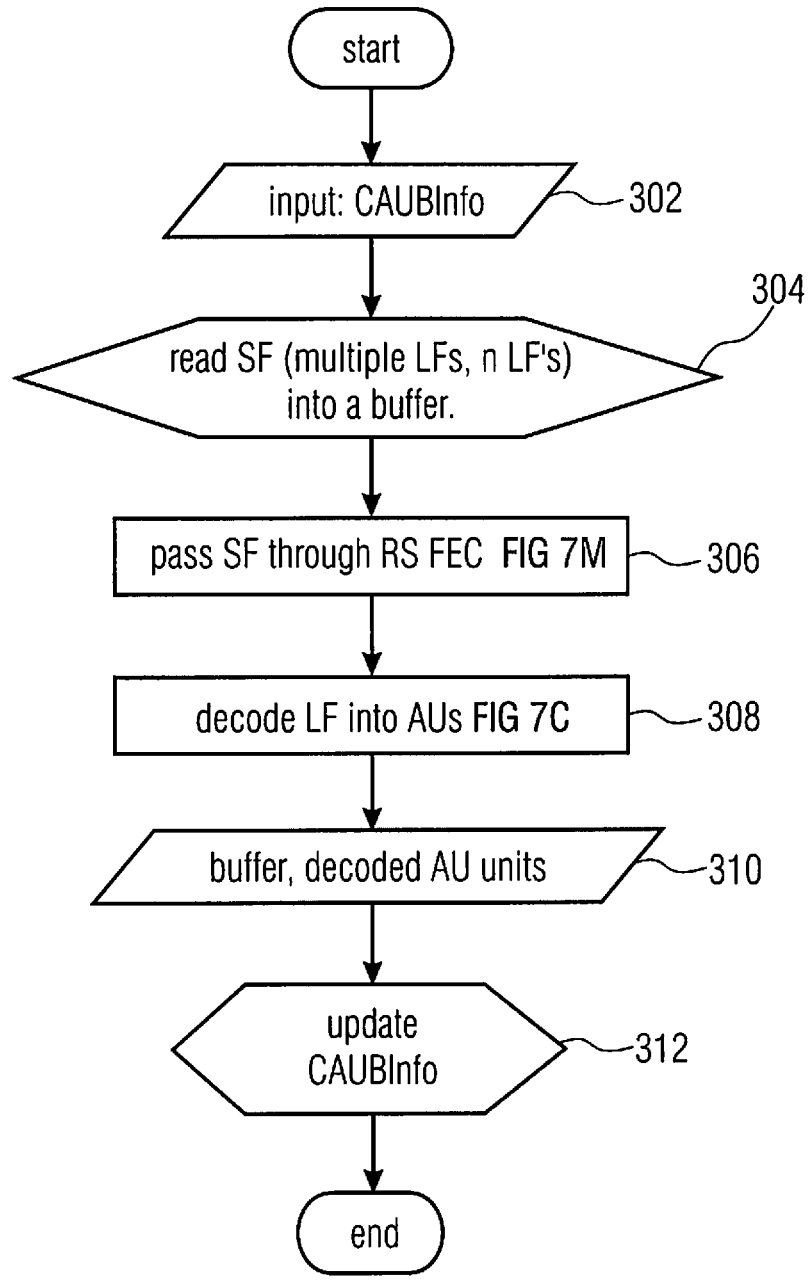
Figure 7M:
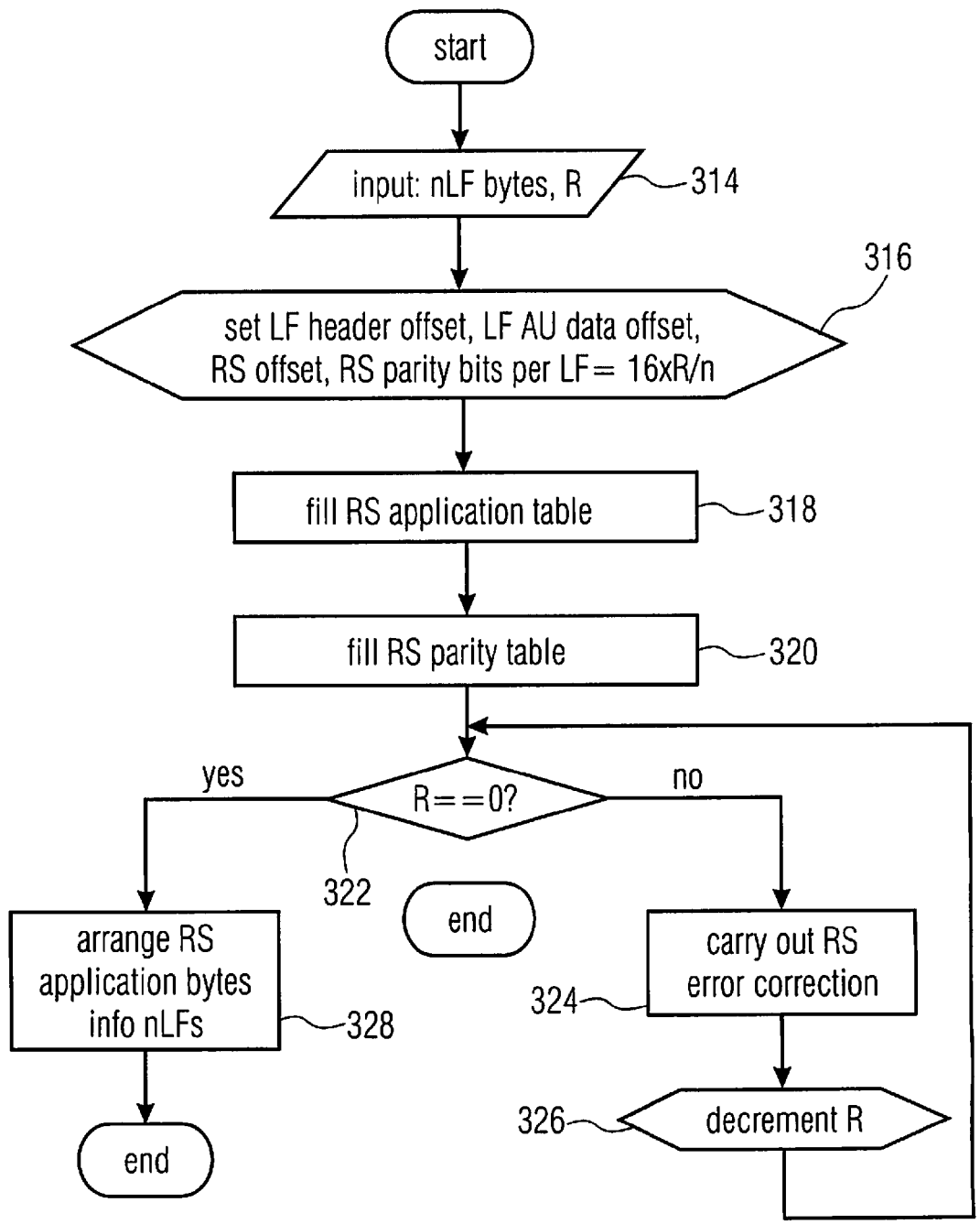

FIG. 7l shows the details of the SF decoding with FEC in step 270 of FIG. 7i. As can be seen, knowing about CAUB info, as indicated at 302, the recoverer 54 reads in step 304 three or four, or—in accordance with an alternative embodiment—any other number, consecutive logical frames, i.e. a superframe, into an internal buffer and subjects this superframe SF in step 306 to an RS FEC with thereupon, decoding the three/four logical frames within the SF in step 308 into AUs as described with respect to FIG. 7c and buffering in step 310 the decoded access units. Finally, recoverer 54 updates CAUB info at step 312. Similar to FIG. 7k, FIG. 7m shows the case of subjecting the SF to an RS FEC. As can be seen, having access to the three/four or—more generally, n-logical frames, i.e. the bytes of the logical frames, and the value of R as indicated at 314, recoverer 54 performs settings in step 316, fills in the RS application table and RS parity table in steps 318 and 320, respectively and checks as to whether R equals zero in step 322. If not, recoverer 54 carries out the RS error correction at step 324 and decrements R at step 326 in order to loop back to step 322. As soon as R equals zero, recoverer 54 arranges the RS application bytes from the application data table 98 in the interleaved format to obtain the n logical frames in step 328.

Figure 8:
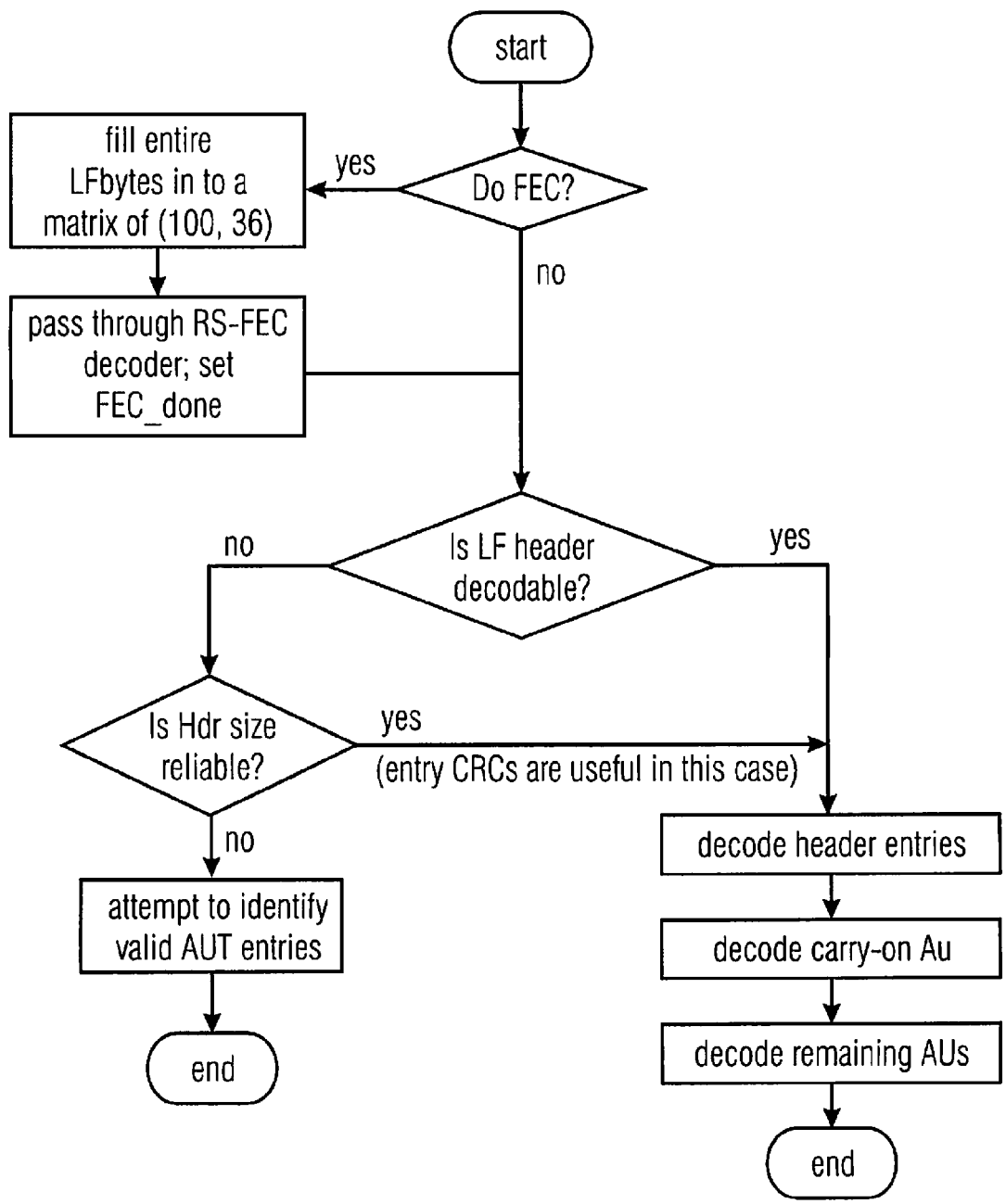
FIG. 8 shows a flow diagram of another embodiment for a mode of operation of the access unit stream recoverer in FIG. 3 in connection with FEC.
Figure 9:
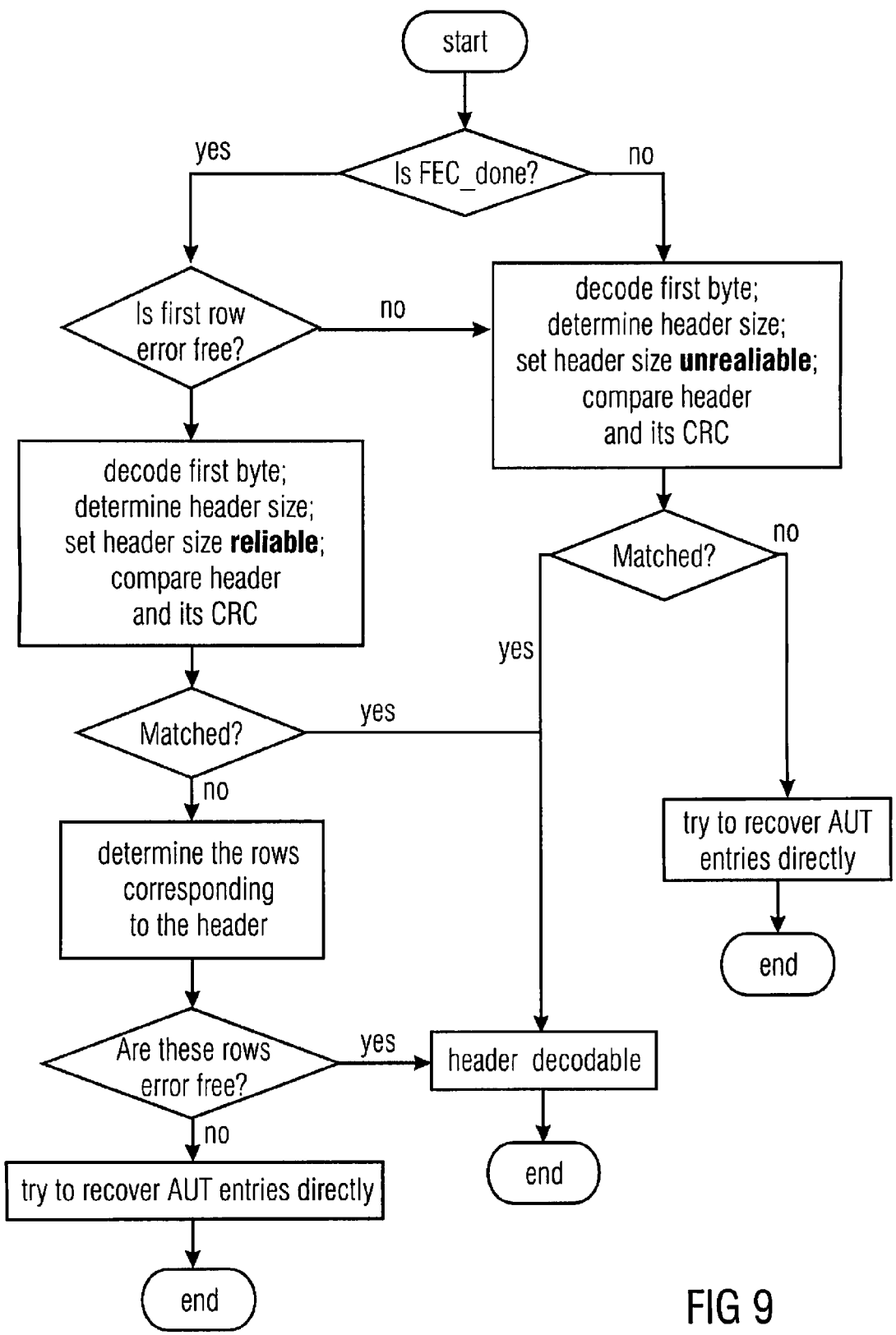
FIG. 9 shows a flow diagram illustrating a mode of operation within the access unit stream recoverer in FIG. 3 after having performed FEC or without FEC.

Finally, FIGS. 8 and 9 show an overview of the FEC transport protection handling at the recoverer 54 in accordance with a certain further embodiment. According to this embodiment, a table of 100 rows and 36 columns which corresponds to 3600 bytes is constructed. Actually the LF contains 3598 bytes, however it is padded on sender and receiver side to 3600 bytes for simplicity. All the bytes are filled in this table, column by column in the following fashion (1,1),(2,1) . . . (100,1),(1,2),(2,2) . . . (10,100). Thus giving apparent interleaving. Depending upon the application columns and FEC columns, correction capability of Reed Solomon FEC is determined and used for decoding each row of the table. Since we don't know the location of error in the table we have to employ RS error decoding. Once the table is passed through FEC decoder, the output may or may not contain the completely error-free bytes. In both the cases normal decoding is employed serially, that is initially first byte of the LF header may be decoded which, in accordance with an alternative embodiment relative to the above one—gives us the size of the LF header, if successful then the complete LF header is decoded and compared with its CRC. The LF header is regarded—in accordance with the present embodiment—as comprising the AUT information, and is further analyzed for individual AUs. The complete Decoder flowchart is in FIGS. 8 and 9.

Thus, the Diveemo embodiment achieves the following advantages by the following aspects:
1. Method and Apparatus for coding, transmitting and decoding video signals via the DRM system
   out of band signaling
   configuration of the data access in band
   at least one logical data stream
      audio/video/data (such as Journaline(R) for sub-titles)
         e.g. 1× video, 5× audio (different languages)
      any codecs for audio and video is codable (downward compatibility for future enhancement)
   DRM compatibility (formatting within the MSC, SDC standard conform)
   efficient bit rate use (e.g. no stuffing)
   flexibly configurable (frame rate, Bitrate, . . . )
   optional fault protection (FEC), flexibly parametrisable, virtual interleaving, 2 time interleaver
   fast up-synchronisation of the receiver possible
   data structure enables future extensions
   robust against reception errors
2. Method for coding und signaling of the transmission of Video signals via the Digital Radio Mondiale system
   Audio-, Video- und Data-AUs are transmitted without additional headers as a 'serial bit stream'
   the definition of the AUs and their borders/lengths is registered with the borders of the transmission frames of the broadcast system (DRM) for enabling a fast access and an easy (Re-) up-synchronization
   index is transmitted redundantly within a logical frame (LF)

in case of a fault in the header, decoder may nevertheless extract AU data via the chain of the entity definition/description in case of a fault in the AUs or in the entity definition/description, merely individual AUs are lost, not necessarily all AUs in the current DRM transmission frame one or more logical data streams (interleaved) are subdivided into data packets of different length fast synchronization onto payload data possible transmission structure is used (forward pointer)

mechanism for future extensions provided

FEC parameter is adaptable to transmission errors error protection within the index and within the data packets enables the extraction of all errorless payload data Summarizing the above embodiments, i.e. the embodiments described first with respect to FIGS. 1 to 3 as well as the following embodiments including the Diveemo embodiments, one advantage of registering the access unit table with the leading/rear end of the logical frames is that the tables are fast and reliably locatable by the decoder and although their length depends on the number of access unit beginnings within the logical frames, the begin of the access unit embedding, i.e. the begin of the useful data section may be kept constant such as, for example, by placing the access unit table at the end when seen in useful data insertion direction. The pointers point to the positions of the access unit beginnings in an absolute sense so that local errors in the logical frame do not prevent other access units which are without errors to be analyzed and used. If an access unit table gets lost, the first carry-on access unit may be completed, even when the access unit table was positioned at the leading end, and if the first carry-on access unit is corrupted, and is, thus, the detection of the end of this access unit and the begin of the next access unit not detectable by parsing despite a seamless insertion, the next access units may be used though—independent from the exact position of this access unit table—because the pointers in the access unit table are defined in an absolute sense, i.e. from a registration point being static.

Furthermore, since the access unit table and the logical frame header are positioned registered to the absolute beginning or the absolute end of the logical frames or at a known offset therefrom, the access unit table and/or the logical frame header is easy and reliably located by the decoding side on the basis of the transmission frames. Even if both, the logical frame header as well as the access unit table were registered relative to the same end, such as the leading or rear end of the logical frame, the useful data section of the logical frame could be located if at least one of the logical frame headers and the access unit table had a constant length as with the above embodiments. By placing, however, logical frame header and access unit table at opposite sides, an optimum use of the access units is possible: if a logical frame header is corrupted, the beginning of the useful data section is nevertheless locatable at the decoding side, and the current access unit may be processed. If the access unit table is corrupted, then the end of the useful data section is known at the decoder and maybe all access units are reconstructable by parsing.

The advantage of presenting the access unit length information within the access unit table is that the information thereon may be used at the decoding side in order to access the next access unit, i.e. the first access unit the beginning of which falls into the current logical frame even then if the carry-on access unit is corrupted and thus not passable. In other words, in case of seamless insertion of the access units, the access unit length indication helps to access an access unit even when the pointer pointing to the beginning of this access unit is corrupted. If padding is needed, this padding may be done in a form of a specially marked access unit type, which are seamlessly integrated into the other access units of the normal access unit types, so that the seamless insertion is maintained.

The above possibility of FEC protection of the access unit table entries individually enables the processing of the access units individually even if some of the access unit table entries are corrupted. Thus, corrupted entries in the access unit table may be skipped because of their constant length and subsequent entries in the access unit table may be evaluated without problem by the recoverer. This is an advantage of the individual CRC protection. Further, even if the number of, or even the existence of, AUT entries is unknown, valid entries may be sniffed out.

Many modifications may be performed on the above embodiments. For example, many alternatives for the specific details in the Diveemo embodiments are readily derivable from the statements with respect to FIGS. 1 to 3. With respect to the RS FEC is it noted, that other FEC codes may be used as well. Further, instead of CRCs within the LFs, FEC data may be incorporated into the LF.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The above resulting transmission signal could be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Apparatus for preparing an access unit stream of consecutive access units, representing media content, for a transmission via a transmission signal, the apparatus being configured to generate a sequence of logical frames from the access unit stream by:
consecutively inserting the consecutive access units into a useful data section of the logical frames of the sequence of logical frames, wherein the logical frames comprise logical frames on which no beginning of an access unit falls, a beginning of one access unit falls, and a beginning of two access units falls, respectively; and providing each logical frame into which a beginning of an access unit falls, with an access unit table comprising, per beginning of the access units falling into the respective logical frame, a pointer pointing thereto,
wherein the apparatus comprises a hardware implantation configured to perform at least one of the consecutively inserting and providing.

2. Apparatus according to claim 1 when the apparatus is configured to generate the sequence of logical frames such that the access unit table borders, or comprises a predetermined constant offset from, a rear or leading end of the logical frames.

3. Apparatus according to claim 1, when the apparatus is configured to generate the sequence of logical frames such that each access unit table comprises a length depending on the number of access units the beginning of which falls into the respective logical frame.

4. Apparatus according to claim 1, wherein the apparatus is configured to generate the sequence of logical frames such that the pointers point to the beginning of the access units whose beginning falls into the respective logical frame from a registration point positioned with respect to the rear or leading end of the respective logical frame in a manner constant among the logical frames into which a beginning of an access unit falls.

5. Apparatus according to claim 1, wherein the apparatus is configured to generate the sequence of logical frames such that the consecutive access units are seamlessly inserted into the useful data section of the logical frames.

6. Apparatus according to claim 1, wherein the apparatus is configured to generate the sequence of logical frames such that the access unit table and logical frame header border opposite ones of the leading and rear ends of the logical frames so that the useful data section is a connected portion extending, for logical frames into which a beginning of an access unit falls, between the access unit table and the logical frame header, respectively, and for logical frames other than the logical frames into which a beginning of an access unit falls, between the logical frame header and the opposite one of the leading and rear ends of the logical frames.

7. Apparatus according to claim 1, wherein the apparatus is configured to generate the sequence of logical frames such that the logical frames headers comprise a length constant for all logical frames.

8. Apparatus according to claim 1 wherein the apparatus is configured to provide, in each logical frame into which a beginning of an access unit falls, the access unit table with a length indication indicating a length of access units the beginning of which falls into the respective logical frame.

9. Apparatus according to claim 1, wherein the apparatus is configured to provide each access unit table with an access unit table entry per beginning of the access units falling into the respective logical frame, each access unit table entry comprising a pointer pointing to a respective one of the beginning of access units falling into the respective logical frame, with each access unit table entry being provided with second additional redundancy data calculated over, and allowing data corruption detection of, a content of the access unit to the beginning of which the pointer of the respective access unit table entry points.

10. Apparatus according to claim 1, wherein the media content comprises audio, video, textual or data content.

11. Apparatus according to claim 1, wherein the apparatus is configured to continue the continuous insertion of the consecutive access units into the logical frames when transitioning from one logical frame to a following logical frame by, beginning the insertion at a position within the following logical frame, independent from a number of access units the beginning of which falls into the respective logical frame.

12. Apparatus according to claim 1, wherein the apparatus is configured to generate the sequence of logical frames such that the access unit tables comprise a length linearly increasing with the number of access units the beginning of which falls into the respective logical frame, at a rate by which a length of the useful data section of the respective logical frame decreases with a number of access units the beginning of which falls into the respective logical frame.

13. Apparatus according to claim 1, wherein the apparatus comprises a stream generator configured to generate the access unit stream from at least two separate input streams of access units, each of which represents video, audio, textual or data content, with the stream generator being configured to generate the access unit stream such that, for each input stream, the access units of the respective input stream are arranged in a presentation order, and the access units of different input streams are arranged within the access unit stream in an interleaved form so that access units of pertaining the same presentation time are grouped together.

14. Apparatus according to claim 13, wherein each access unit table comprises one access unit table entry per access unit the beginning of which falls into the respective logical frame, and with which the respective access unit table entry is associated, wherein the apparatus is further configured to generate the sequence of logical frames such that each access unit table entry comprises a pointer pointing to a position of its associated access unit within the respective logical frame, and a stream ID indicating to which input stream its associated access unit belongs to.

15. Apparatus according to claim 1, wherein each access unit table comprises one access unit table entry per access unit the beginning of which falls into the respective logical frame, and with which the respective access unit table entry is associated, wherein the apparatus is further configured to generate the sequence of logical frames such that each access unit table entry comprises a pointer pointing to the beginning of its associated access unit within the respective logical frame, and a length indication indicating a length of its associated access unit.

16. Apparatus according to claim 12, wherein the logical frame headers border, or comprise a predetermined offset from, one of a leading end or a rear end of the respective logical frames, and the logical frames further each comprise a FEC data section of constant length and positioned adjacent to the respective logical frame header, the FEC data sections defining systematic FEC data, FEC-protecting portions of the logical frames external to the FEC data sections and comprising, at least, the useful data section, the logical frame header and the access unit table, if present thereof.

17. Apparatus according to claim 1, wherein the apparatus is further configured to generate the sequence of logical frames such that each logical frame header further comprises a flag signaling the existence or absence of an enhancement section within the respective logical frame header, and, if the existence is signaled, the enhancement section in addition to the logical frame header and the useful data section.

18. Apparatus according to claim 1,
wherein the apparatus is configured to provide each logical frame with a logical frame header indicating the absence of an access unit table in the respective logical frame for logical frames into which no beginning of any of the consecutive access unit falls, and the length of the access unit table of the respective logical frame for logical frames into which the beginning of at least one of the consecutive access units falls,
wherein the apparatus is configured to provide each access unit table with an access unit table entry per access unit the beginning of which falls into the respective logical frame, and the logical frame header indicating the length of the access unit table of the respective logical frame in units of the number of access unit table entries within the access unit table of the respective logical frames, with beginnings of the access unit table entries being spaced apart from the leading or rear end of the logical frame in units of a constant length, each access unit table entry comprising a pointer pointing to a respective one of the beginning of the access units, falling into respective logical frame, with each access unit table being provided with additional redundancy data allowing for an access unit table entry individual data corruption detection and/or correction,
wherein the apparatus is configured to perform the continuous insertion of the consecutive access units into the useful data section of the logical frames using a useful data insertion direction, and to arrange the access unit table and the logical frame header within the logical frames into which a beginning of an access unit falls, so that the useful data section occupies a connected portion of the respective logical frame comprising one constantly positioned border and a varying positioned border offset from the constantly positioned border depending on the length of the access unit table,
wherein the apparatus is configured to generate the sequence of logical frames such that the access unit table and logical frame header border, or are constantly offset from, opposite ones of the leading and rear ends of the logical frames.

19. Apparatus according to claim 1, when the apparatus is configured to provide each logical frame with a logical frame header indicating the absence of an access unit table in the respective logical frame or logical frames into which no beginning of any of the consecutive access unit falls, and the length of the access unit table of the respective logical frame for logical frames into which the beginning of at least one of the consecutive access units falls.

20. Apparatus according to claim 1, wherein the apparatus is configured to provide each logical frame with the logical frame header such that the respective logical frame header borders, or has a predetermined constant offset from, the rear or leading end of the respective logical frame.

21. Apparatus according to claim 1, wherein the apparatus is configured to perform the continuous insertion of the consecutive access units into the useful data section of the logical frames using a useful data insertion direction, and to arrange the access unit table and the logical frame header within the logical frames into which a beginning of an access unit falls, so that the useful data section occupies a connected portion of the respective logical frame having one constantly positioned border and a varying positioned border offset from the constantly positioned border depending on the length of the access unit table.

22. Apparatus according to claim 1, wherein the apparatus is configured to generate the sequence of logical frames such that the access unit tables and logical frame header border, or are constantly offset from, opposite ones of the leading and rear ends of the logical frames.

23. Apparatus according to claim 1 wherein the apparatus is configured to provide each access unit table with an access unit table entry per access unit the beginning of which falls into the respective logical frame, and a logical frame header indicating the number of access unit table entries within the access unit table of the respective logical frames, with beginnings of the access unit table entries being spaced apart from the leading or rear end of the logical frame in units of a constant length, each access unit table entry comprising a pointer pointing to a respective one of the beginning of the access units, falling into respective logical frame, with each access unit table being provided with additional redundancy data allowing for an access unit table entry individual data corruption detection and/or correction.

24. Apparatus according to claim 1, wherein the apparatus is configured to provide each access unit table with an access unit table entry per beginning of the access units falling into the respective logical frame, each access unit table entry comprising a pointer pointing to a respective one of the beginning of access units falling into the respective logical frame, with each access unit table entry being provided with first redundancy data calculated over, and allowing data corruption detection of, at least the pointer of the respective access unit table entry.

25. Transmission chain comprising an apparatus for preparing an access unit stream of consecutive access units, representing media content, for a transmission via a transmission signal, the apparatus being configured to generate a sequence of logical frames from the access unit stream by:
consecutively inserting the consecutive access units into a useful data section of the logical frames of the sequence of logical frames, wherein the logical frames comprise logical frames into which no beginning of an access unit falls, a beginning of one access unit falls, and a beginning of two access units falls, respectively; and
providing each logical frame into which a beginning of an access unit falls, with an access unit table comprising, per beginning of the access units falling into the respective logical frame , a pointer pointing thereto,
wherein the apparatus is configured to provide each logical frame with a logical frame header indicating the absence of an access unit table in the respective logical frame for logical frames into which no beginning of any of the consecutive access unit falls, and the length of the access unit table of the respective logical frame for logical frames into which the beginning of at least one of the consecutive access units falls,
wherein the apparatus is configured to provide each access unit table with an access unit table entry per access unit the beginning of which falls into the respective logical frame, and the logical frame header indicating the length of the access unit table of the respective logical frame in units of the number of access unit table entries within the access unit table of the respective logical frames, with beginnings of the access unit table entries being spaced apart from the leading or rear end of the logical frame in units of a constant length, each access unit table entry comprising a pointer pointing to a respective one of the beginning of the access units, falling into respective logical frame, with each access unit table being provided with additional redundancy data allowing for an access unit table entry individual data corruption detection and/or correction,
wherein the apparatus is configured to perform the continuous insertion of the consecutive access units into the useful data section of the logical frames using a useful data insertion direction, and to arrange the access unit table and the logical frame header within the logical frames into which a beginning of an access unit falls, so that the useful data section occupies a connected portion of the respective logical frame comprising one constantly positioned border and a varying positioned border offset from the constantly positioned border depending on the length of the access unit table,
wherein the apparatus is configured to generate the sequence of logical frames such that the access unit table and logical frame header border, or are constantly offset from, opposite ones of the leading and rear ends of the logical frames,
and a transmission stage for transmitting the transmission signal,
wherein the transmission stage comprises a hardware implantation configured to perform the transmitting and the apparatus comprises a hardware implantation configured to perform at least one of the consecutively inserting and providing.

26. Transmission chain according to claim 25, wherein the transmission stage is configured to broadcast the transmission signal.

27. Apparatus for recovering an access unit stream of consecutive access units, representing media content, from a sequence of logical frames of a transmission signal, each logical frame comprising a useful data section, wherein the consecutive access units are consecutively inserted into the useful data section of the sequence of logical frames, wherein the logical frames comprise logical frames into which no beginning of an access unit falls, a beginning of one access unit falls, and a beginning of two access units falls, respectively, the apparatus being configured to, for a predetermined logical frame, into which a beginning of an access unit falls, extract an access unit table from the predetermined logical frame comprising, per beginning of the access units falling into the predetermined logical frame, a pointer pointing to a respective begin position within the predetermined logical frame, and locate, and commence extraction of, the respective access unit the beginning of which falls into the predetermined logical frame, by use of the respective pointer, the apparatus also being configured to consecutively extract the consecutive access units of the access unit stream from the useful data section of the logical frames of the sequence of logical frames,
wherein the apparatus comprises a hardware implantation configured to perform the locating, and commencing of the extraction, and the consecutive extraction.

28. Apparatus according to claim 27, wherein the apparatus is configured to locate the access unit table of the predetermined logical frame at, or at a predetermined constant offset from, a rear or leading end of the logical frames.

29. Apparatus according to claim 27, wherein the apparatus is configured to, in locating a respective access unit the beginning of which falls into the predetermined logical frame, using the respective pointer as a displacement from a registration point positioned with respect to the rear or leading end of the predetermined logical frame, wherein the apparatus is configured to also extract the access unit table of other logical frames into which the beginning of the access units falls and use a respective pointer comprised thereby as a displacement relative to said registration point within said other logical frames.

30. Apparatus according to claim 27, wherein the apparatus is configured to locate the access unit table and the logical frame header of the predetermined logical frame at opposite ones of the leading and rear ends of the logical frames.

31. Apparatus according to claim 27 wherein the apparatus is configured to extract from the access unit table a length indication indicating a length of a respective access unit the beginning of which falls into the predetermined logical frame.

32. Apparatus according to claim 27, wherein the apparatus is configured to extract, for each access unit table entry, additional redundancy data and perform an access unit table entry individual data corruption detection and/or correction on the access unit table entries, and to locate, and commence extraction of, merely those access units the beginning of which falls into the predetermined logical frame, the respective access unit table entry for which is uncorrupted/corrected.

33. Apparatus according to claim 27, wherein the apparatus is configured to, in extracting the access unit table from the predetermined logical frame, extract from each access unit table entry the pointer, and second additional redundancy data, wherein the apparatus is configured to use the second additional redundancy data to perform data corruption detection with respect to a content of the access unit to the beginning of which the pointer of the respective access unit table entry points.

34. Apparatus according to claim 27, wherein the media content comprises audio, video, textual and/or data content.

35. Apparatus according to claim 27, wherein the apparatus is configured to continue the consecutive extraction of the consecutive access units from the logical frames when transitioning from the predetermined logical frame to a following logical frame by, beginning the extraction at a position within the following logical frame, independent from a number of access units the beginning of which falls into the predetermined logical frame.

36. Apparatus according to claim 28, wherein the access unit stream comprises at least two separate input streams of consecutive access units, each of which represents video, audio, textual or data content, wherein, for each input stream, the access units of the respective input stream are arranged within the access unit stream in a presentation order of the at least two input streams, wherein the access unit table comprises one access unit table entry per access unit the beginning of which falls into the respective logical frame, and with which the respective access unit table entry is associated, and each access unit table entry comprises a pointer pointing to a position of its associated access unit within the respective logical frame, and a stream ID indicating to which input stream its associated access unit belongs to, wherein the apparatus is configured to assign the access units extracted from the predetermined logical frame to the corresponding input stream by use of the stream ID of the associated access unit entry.

37. Apparatus according to claim 27, wherein the logical frame headers border, or comprise a predetermined offset from, one of a leading end or a rear end of the respective logical frames, and the logical frames further each comprise a FEC data section of constant length and positioned adjacent to the respective logical frame header, the FEC data sections defining systematic FEC data, FEC-protecting portions of the logical frames external to the FEC data sections and comprising, at least, the useful data section, the logical frame header and the access unit table, if present, thereof, wherein the apparatus is configured to perform FEC processing using the FEC data within the FEC data sections on the FEC-protected portions of the logical frames.

38. Apparatus according to claim 27, wherein the apparatus is further configured to inspect, within each logical frame header, a flag as to whether an enhancement section exists within the respective logical frame or not, and use this information to locate an extension of the useful data section within the logical frames.

39. Apparatus according to claim 27,
wherein the apparatus is configured to extract from each logical frame a logical frame header indicating the absence of, or the length of an access unit table in the respective logical frame, and locate an extension of the useful data section of the respective logical frame depending thereupon,
wherein the apparatus is configured to perform the consecutive extraction of the consecutive access units from the logical frames using a useful data extraction direction within the logical frames, and to locate a varying positioned end of the access unit table by applying the length of the access unit table in a counter direction contrary to the useful data extraction direction from a constantly positioned end thereof,
wherein the apparatus is configured to locate the access unit table and the logical frame header of the logical frame at, or at a constant offset to, opposite ones of the leading and rear ends of the predetermined logical frame,
wherein the logical frame header indicates the length of the respective access unit table as a number of access unit table entries within the access unit table of the respective logical frames and a number of access units the beginning of which falls into the predetermined logical frame, respectively, wherein the apparatus is configured to, in extracting the access unit table from the predetermined logical frame, consecutively extract the number of access unit table entries with stepping, starting at the leading or rear end of the logical frame or at a position within the predetermined logical frame, comprising a predetermined constant offset therefrom, in units of a constant length from one access unit table entry to the next, in order to acquire, for each access unit table entry, the pointer pointing to a respective beginning position of the respective access unit,
wherein the apparatus is configured to extract additional redundancy information for the logical frame header from the predetermined logical frame, and use same in order to perform data corruption detection or error correction attempts on the logical frame header, and, if the latter turns out to be corrupted, extract, if present, a remainder portion of the useful data section of the predetermined logical frame belonging to an access unit the beginning of which any preceding logical frame and extends into the predetermined logical frame, the remainder portion starting at a start position of the useful data section of the predetermined logical frame constantly positioned for all logical frames,
wherein the apparatus is configured to, if the logical frame header turns out to be corrupted,
step, starting at the leading or rear end of the logical frame or at the position within the predetermined logical frame, comprising the predetermined constant offset therefrom, in units of the constant length from one possibly present access unit table entry to the next, in order to:
acquire, for each possibly present access unit table entry, a putative pointer pointing to a putative begin position of a respective access unit and additional redundancy data,
perform an access unit table entry individual data corruption detection on the possibly present access unit table entries, and
locate, and commence extraction of, merely at access units at putative begin positions to which the pointers of those possibly present access unit table entries point which turn out to be correct by the data corruption detection.

40. Apparatus according to claim 27 wherein the apparatus is configured to extract from each logical frame a logical frame header indicating the absence of, or the length of an access unit table in the respective logical frame, and locate an extension of the useful data section of the respective logical frame depending thereupon.

41. Apparatus according to claim 27, wherein the apparatus is configured to locate, in each logical frame 20) , the logical frame header at, or at a predetermined constant offset from, the leading or rear end of the respective logical frame.

42. Apparatus according to claim 27, wherein the apparatus is configured to perform the consecutive extraction of the consecutive access units from the logical frames using a useful data extraction direction within the logical frames, and to locate a varying positioned end of the access unit table by applying the length of the access unit table in a counter direction contrary to the useful data extraction direction from a constantly positioned end thereof.

43. Apparatus according claim 27, wherein the apparatus is configured to locate the access unit table and the logical frame header of the logical frame at, or at a constant offset to, opposite ones of the leading and rear ends of the predetermined logical frame.

44. Apparatus according to claim 27, wherein the logical frame header indicates the length of the respective access unit table as a number of access unit table entries within the access unit table of the respective logical frames and a number of access units the beginning of which falls into the predetermined logical frame, respectively, wherein the apparatus is configured to, in extracting the access unit table from the predetermined logical frame, consecutively extract the number of access unit table entries with stepping, starting at the leading or rear end of the logical frame or at a position within the predetermined logical frame, having a predetermined constant offset therefrom, in units of a constant length from one access unit table entry to the next, in order to obtain, for each access unit table entry, the pointer pointing to a respective begin position of the respective access unit.

45. Apparatus according to claim 27, wherein the apparatus is configured to extract additional redundancy information for the logical frame header from the predetermined logical frame, and use same in order to perform data corruption detection or error correction attempts on the logical frame header, and, if the latter turns out to be corrupted, extract, if present, a remainder portion of the useful data section of the predetermined logical frame belonging to an access unit the beginning of which any preceding logical frame and extends into the predetermined logical frame, the remainder portion starting at a start position of the useful data section of the predetermined logical frame constantly positioned for all logical frames.

46. Apparatus according to claim 27, wherein the apparatus is configured to, if the logical frame header turns out to be corrupted,
step, starting at the leading or rear end of the logical frame or at the position within the predetermined logical frame, having the predetermined constant offset therefrom, in units of the constant length from one possibly present access unit table entry to the next, in order to:
obtain, for each possibly present access unit table entry, a putative pointer pointing to a putative begin position of a respective access unit and additional redundancy data,
perform an access unit table entry individual data corruption detection on the possibly present access unit table entries, and
locate, and commence extraction of, merely at access units at putative begin positions to which the pointers of those possibly present access unit table entries point which turn out to be correct by the data corruption detection.

47. Method for preparing an access unit stream of consecutive access units, representing media content, for a transmission via a transmission signal, the method comprising generating a sequence of logical frames from the access unit stream by:
consecutively inserting, performed by an inserter, the consecutive access units into a useful data section of the logical frames of the sequence of logical frames, wherein the logical frames comprise logical frames into which no beginning of an access unit falls, a beginning of one access unit falls, and a beginning of two access units falls, respectively; and providing, performed by a provider, each logical frame into which a beginning of an access unit falls, with an access unit table comprising, per beginning of the access units falling into the respective logical frame, a pointer pointing thereto,
wherein at least one of the inserter and provider comprises a hardware implementation.

48. Method for recovering an access unit stream of consecutive access units, representing media content, from a sequence of logical frames of a transmission signal, each logical frame comprising a useful data section, wherein the consecutive access units are consecutively inserted into the useful data section of the sequence of logical frames, wherein the logical frames comprise logical frames into which no beginning of an access unit falls, a beginning of one access unit falls, and a beginning of two access units falls, respectively, the method comprising, for a predetermined logical frame, into which a beginning of an access unit falls, extracting, performed by an access unit table extractor, an access unit table from the predetermined logical frame comprising, per beginning of the access units falling into the predetermined logical frame, a pointer pointing to a respective begin position within the predetermined logical frame, and locating, and commencing extraction of, performed by a locator the respective access unit the beginning of which falls into the predetermined logical frame, by use of the respective pointer, the method also comprising consecutively extracting, performed by an access unit extractor, the consecutive access units of the access unit stream from the useful data section of the logical frames of the sequence of logical frames,
wherein at least one of the access unit table extractor, the locator and access unit extractor comprises a hardware implementation.

49. A non-transitory computer-readable medium having stored thereon a computer program comprising a program code for performing, when running on a computer, a method for recovering an access unit stream of consecutive access units, representing media content, from a sequence of logical frames of a transmission signal, each logical frame comprising a useful data section, wherein the consecutive access units are consecutively inserted into the useful data section of the sequence of logical frames, wherein the logical frames comprise logical frames into which no beginning of an access unit falls, a beginning of one access unit falls, and a beginning of two access units falls, respectively, the method comprising, for a predetermined logical frame, into which a beginning of an access unit falls, extracting an access unit table from the predetermined logical frame comprising, per beginning of the access units falling into the predetermined logical frame, a pointer pointing to a respective begin position within the predetermined logical frame, and locating, and commencing extraction of, the respective access unit the beginning of which falls into the predetermined logical frame, by use of the respective pointer, the method also comprising consecutively extracting the consecutive access units of the access unit stream from the useful data section of the logical frames of the sequence of logical frames.

50. A non-transitory computer-readable medium having stored thereon a computer program comprising a program code for performing, when running on a computer, a method for preparing an access unit stream of consecutive access units, representing media content, for a transmission via a transmission signal, the method comprising generating a sequence of logical frames from the access unit stream by consecutively inserting the consecutive access units into a useful data section of the logical frames of the sequence of logical frames, wherein the logical frames comprise logical frames into which no beginning of an access unit falls, a beginning of one access unit falls, and a beginning of two access units falls, respectively; and providing each logical frame into which a beginning of an access unit falls, with an access unit table comprising, per beginning of the access units falling into the respective logical frame , a pointer pointing thereto.

* * * * *